(12) United States Patent
Granet et al.

(10) Patent No.: US 9,297,893 B2
(45) Date of Patent: Mar. 29, 2016

(54) ANTENNA SYSTEM

(75) Inventors: Christophe Jean-Marc Granet, North Ryde (AU); John Seward Kot, North Ryde (AU); Ian Maxwell Davis, North Ryde (AU); Gregory Steven Pope, Edinburgh (AU)

(73) Assignee: BAE SYSTEMS AUSTRALIA LIMITED, Edinburgh (AU)

( * ) Notice: Subject to any disclaimer, the term of this patent is extended or adjusted under 35 U.S.C. 154(b) by 365 days.

(21) Appl. No.: 13/883,644

(22) PCT Filed: Nov. 8, 2011

(86) PCT No.: PCT/AU2011/001441
§ 371 (c)(1),
(2), (4) Date: Jul. 10, 2013

(87) PCT Pub. No.: WO2012/061881
PCT Pub. Date: May 18, 2012

(65) Prior Publication Data
US 2013/0307719 A1 Nov. 21, 2013

(30) Foreign Application Priority Data
Nov. 8, 2010 (AU) .............................. 2010904941

(51) Int. Cl.
*G01S 13/44* (2006.01)
*H01P 1/161* (2006.01)
(Continued)

(52) U.S. Cl.
CPC .......... *G01S 13/4481* (2013.01); *G01S 13/4409* (2013.01); *H01P 1/161* (2013.01); *H01Q 3/08* (2013.01); *H01Q 13/0208* (2013.01); *H01Q 13/10* (2013.01); *H01Q 19/13* (2013.01)

(58) Field of Classification Search
CPC . G01S 13/4409; G01S 13/4481; H01P 1/161; H01Q 13/0208; H01Q 13/10; H01Q 19/13; H01Q 3/08
USPC ......................................................... 342/153
See application file for complete search history.

(56) References Cited

U.S. PATENT DOCUMENTS 3,821,741 A 6/1974 D'Oro et al.
3,936,838 A 2/1976 Foldes
(Continued)

FOREIGN PATENT DOCUMENTS

JP 60-160702 8/1985
JP 6175604 A 4/1986
(Continued)

OTHER PUBLICATIONS

Office Action for corresponding Japanese Patent Application No. 2013-538003, mailed on Sep. 2, 2014, 3 pages.
(Continued)

*Primary Examiner* — Timothy A Brainard
(74) *Attorney, Agent, or Firm* — Maine Cernota & Rardin

(57) ABSTRACT

An antenna system including: an input port configured to receive tracking mode signals, in two orthogonal polarizations, from a target; a tracking coupler, configured to receive the tracking mode signals from the input port, the tracking coupler including: a first pair of opposed slot couplers configured to extract tracking signals from the tracking mode signals in a first one of the orthogonal polarizations, and a second pair of opposed slot couplers configured to extract tracking signals from the tracking mode signals in a second one of the orthogonal polarizations; and a tracking combiner network configured to combine the extracted tracking signals from the pairs of opposed slot couplers to generate tracking output signals for use in controlling the antenna system to track the target.

19 Claims, 19 Drawing Sheets

(51) Int. Cl.
*H01Q 3/08* (2006.01)
*H01Q 13/02* (2006.01)
*H01Q 19/13* (2006.01)
*H01Q 13/10* (2006.01)

(56) References Cited

U.S. PATENT DOCUMENTS

| | | | | |
|---|---|---|---|---|
| 4,258,366 | A * | 3/1981 | Frosch | H01P 1/161 343/755 |
| 4,358,770 | A * | 11/1982 | Satoh et al. | 343/786 |
| 6,549,173 | B1 * | 4/2003 | King et al. | 343/772 |
| 6,812,807 | B2 * | 11/2004 | Ergene | H01Q 13/0208 333/125 |
| 7,236,681 | B2 * | 6/2007 | Moheb et al. | 385/147 |
| 8,077,103 | B1 * | 12/2011 | Acosta et al. | 343/756 |

FOREIGN PATENT DOCUMENTS

| | | |
|---|---|---|
| JP | 05251906 A | 9/1993 |
| JP | 2001-007641 | 1/2001 |

OTHER PUBLICATIONS

International Search Report (PCT/ISA/210) Issued on Feb. 14, 2012, by the Australian Patent Office as the International Searching Authority for International Application No. PCT/AU2011/001441.

International Preliminary Report on Patentability issued in connection with International Application No. PCT/AU2011/001441.

* cited by examiner

ANTENNA SYSTEM

FIELD

The present invention relates to antenna systems, components for antenna systems, tracking couplers for antenna systems, and methods of tracking a target using an antenna system, for example, antenna systems for satellite communications and waveguide couplers for antenna systems.

BACKGROUND

Antenna systems are used for wireless communications, for radio detection and ranging (RADAR) applications, and for electronic warfare (e.g., jamming). For efficient operation, it is desirable to align an antenna of the system with the most direct electromagnetic propagation path to a target. For example, dish antennas send and receive radiation most efficiently to and from a direction generally aligned with a central axis of the dish, referred to as the boresight of the antenna. Antenna alignment presents many difficulties, particularly when the antenna system and the target are moving relative to one another (e.g., for antennas mounted to vehicles, or for satellite targets), and when the received electromagnetic power fluctuates (e.g., due to environmental changes in the electromagnetic path between the target and the antenna system).

For satellite communication (SATCOM) applications, particularly for antennas mounted to vehicles, a technique known as conical scanning can be used by an antenna system to track its corresponding target satellite. In conical scanning, the antenna of the antenna system continuously scans in a circle around the central path between the antenna and the satellite. The antenna system determines from signal variations that occur as each iteration of the circle is traversed whether the antenna is pointing at the target, and can control the antenna to track movement of the target. A problem with conical scanning is that the antenna is never pointed directly at the target, thus there is always power loss associated with both signal reception and transmission. For widely separated transmit and receive frequencies, e.g., as required by some communications protocols, the power loss in the transmit band or the receive band can be significant. As the apparent angular velocity of the target increases relative to the antenna beam width, the required scanning speed increases. This can occur for example due to the velocity of the target, rapid movement of the antenna platform, or for an antenna with a very narrow beamwidth. Furthermore, the angle of the alignment error which can be corrected in conical scanning may not be sufficient for large alignment errors, and antenna systems may need to enter an inefficient time-consuming search mode to locate the target.

An alternative technique for target tracking is monopulse tracking, where the antenna system receives propagating electromagnetic energy from two different beam patterns: a central main beam pattern (corresponding to the symmetric "sum" beam) carries energy received along the antenna boresight (i.e., the optical axis or the direction of maximum gain of a directional antenna), while one or more non-central "null" beam patterns (corresponding to "difference" beams) carry radiation received from off-boresight directions that are generally anti-symmetric with respect to the boresight (and therefore the difference beams have a null aligned with the antenna boresight). Asymmetry in the received power between opposite sides of the boresight indicates that the target is off axis. The magnitude and phase of the signals received in the difference beams, relative to the signal received by the sum beam, indicate both the magnitude and direction of the angular alignment error between the antenna boresight and the target, and can be used by a monopulse scanning antenna system to correct its direction and track the target.

However, monopulse tracking generally requires antenna systems with relatively large waveguide feeds to extract the tracking signals (some require large mechanical structures to separately detect the on-boresight and the off-boresight signals), and thus may not be used in at least some tracking applications which require a smaller antenna system (e.g., for antenna systems mounted in vehicles). Furthermore monopulse tracking systems may only provide tracking information in one dimension (e.g., up and down), or may be insufficiently flexible to track a target using received radiation in a variety of polarisations. For example, existing multihole tracking mode couplers can be far too long for certain applications, e.g., in SATCOM for moving antenna systems.

Existing single slot monopulse couplers can be very short, but have discontinuities in the main circular waveguide path which render them unsuitable for applications where there are two widely separated transmit and receive bands because the discontinuities introduce unacceptable levels of higher-order waveguide modes (e.g., TM11 modes in circular waveguides).

It is desired to address or ameliorate one or more disadvantages or limitations associated with the prior art, or to at least provide a useful alternative.

SUMMARY

In accordance with the present invention, there is provided an antenna system including:

an input port configured to receive tracking mode signals, in two orthogonal polarisations, from a target;

a tracking coupler, configured to receive the tracking mode signals from the input port, the tracking coupler including:

a first pair of opposed slot couplers configured to extract tracking signals from the tracking mode signals in a first one of the orthogonal polarisations, and a second pair of opposed slot couplers configured to extract tracking signals from the tracking mode signals in a second one of the orthogonal polarisations; and a tracking combiner network configured to combine the extracted tracking signals from the pairs of opposed slot couplers to generate tracking output signals for use in controlling the antenna system to track the target.

The present invention also provides an antenna system, including:

an input port configured to receive tracking mode signals from a target;

a tracking coupler configured to extract tracking signals from the received tracking mode signals;

a tracking combiner network configured to combine the extracted tracking signals to generate a tracking output signal for use in controlling the antenna system to track the target;

a transmit subsystem configured to generate transmit signals for sending to the target; and transmit-reject filters configured to reject the transmit signals from the tracking combiner network.

The present invention also provides an antenna system, including:
- a receive coupler including slot couplers configured to extract receive signals from received receive mode signals from a target;
- a receive combiner network configured to combine the extracted receive signals to generate received signals;
- a transmit subsystem configured to generate transmit signals for sending to the target; and
- transmit-reject filters configured to reject the transmit signals from the receive combiner network.

The present invention also provides a tracking coupler for an antenna system, including:
- two or more orthogonal slot couplers configured to extract tracking signals from orthogonal higher-order modes received by the antenna system, for use in controlling the antenna system to track a target; and
- longitudinal ridges configured to couple a fundamental mode received by the antenna system through the tracking coupler for use in generating a receive signal.

The present invention also provides a method of tracking a target using an antenna system including:
- receiving tracking mode signals, in two orthogonal polarisations, from the target, using the antenna system;
- extracting tracking signals from the tracking mode signals in a first one of the orthogonal polarisations using a first pair of opposed slot couplers;
- extracting tracking signals from the tracking mode signals in a second one of the orthogonal polarisations using a second pair of opposed slot couplers; and
- combining the extracted tracking signals from both orthogonal polarisations to generate tracking output signals for use in controlling the antenna system to track the target.

BRIEF DESCRIPTION OF THE DRAWINGS

Preferred embodiments of the present invention are hereinafter described, by way of example only, with reference to the accompanying drawings, in which.

DETAILED DESCRIPTION

Overview

Figure 1A:
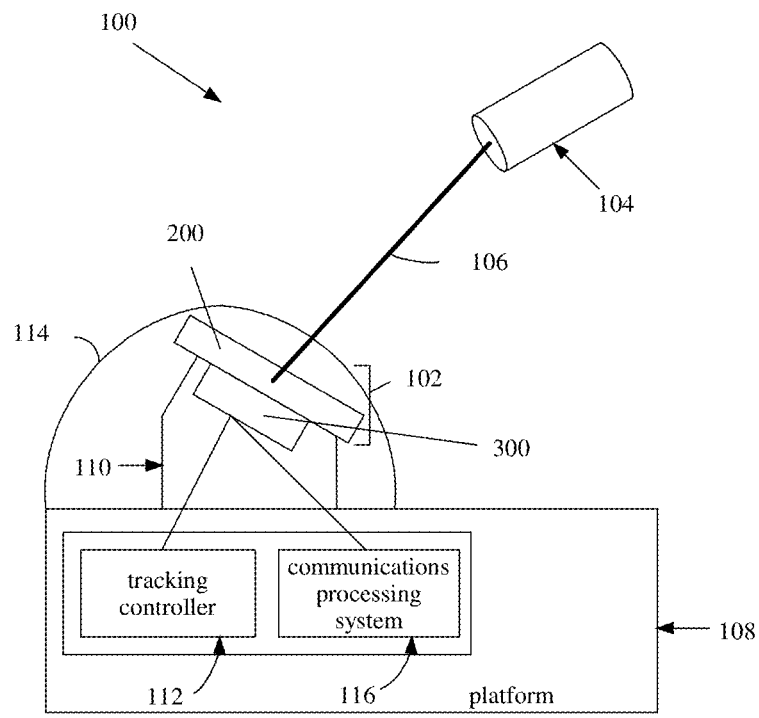
FIG. 1A is a schematic diagram of a communication system, including an antenna system.

An antenna system 102, as shown in FIG. 1A, detects/receives electromagnetic radiation from a target 104 along an electromagnetic path or link 106 between the target 104 and the antenna system 102. The antenna system 102 can be used for satellite communications (in a communication system 100 shown in FIG. 1A), for RADAR applications, or for electronic warfare applications (e.g., tracking jammers and tracking receivers).

The antenna system 102 includes a reflector subsystem 200 for receiving and transmitting electromagnetic radiation along the link 106. The reflector subsystem 200 is connected to a feed subsystem 300 of the antenna system 102 which has waveguides for guiding electromagnetic radiation to and from the reflector subsystem 200.

The antenna system 102 is mounted on a platform 108 by a mount 110 (also referred to as a pedestal). The platform 108 can be a moving platform, such as a vehicle (e.g., a land vehicle, a ship, or an aircraft, including unmanned vehicles). The mount 110 allows for and controls movement of the antenna system 102 to point the reflector subsystem 200 along the link 106 to the target 104, i.e., to track the target 104. The mount 110 has at least two axes of movement to provide pointing control in the azimuthal and vertical (elevation) directions; a third axis can also be provided for improved tracking movement. The pointing direction of the antenna system 102 is controlled by a tracking controller 112 in communication with the mount 110 (using electronic control connections) and the feed subsystem 300 (using electronic communications to receive tracking signals from the antenna system 102).

The antenna system 102 is mounted to the platform 108 in a substantially sealed radome 114 which protects the antenna system 102 from air movement (wind and air resistance) and the surrounding environment (e.g., weather, and dirt). The antenna system 102 is mounted in the radome 114 to allow sufficient movement of the antenna system 102 to track the target 104.

The antenna system 102 is connected to a communications processing system 116 (via one or more electronic communications connections) which sends and receives signals to and from the antenna system 102 to send and receive information between the platform 108 and the target 104. In RADAR applications, the information can be used for detection and ranging of the target 104. In SATCOM applications, the information can be digitally encoded data arranged in accordance with a communications protocol, such as the protocols associated with the Wideband Global SATCOM System (WGS). The RADAR or SATCOM protocol also defines which polarisations are transmitted and received (e.g., circular or linear polarisation for the uplink or the downlink).

Monopulse Tracking

The antenna system 102 is configured to send and receive propagating electromagnetic radiation along the link 106. The antenna system 102 is configured to receive radiation from two types of radiation pattern: a sum pattern and one or more difference patterns. The sum pattern has even symmetry about the axis of the antenna system 102, with a maximum aligned with the antenna boresight. The difference patterns are anti-symmetric with respect to the axis of the antenna system 102, and have a null aligned with the antenna boresight 118.

Figure 1B:
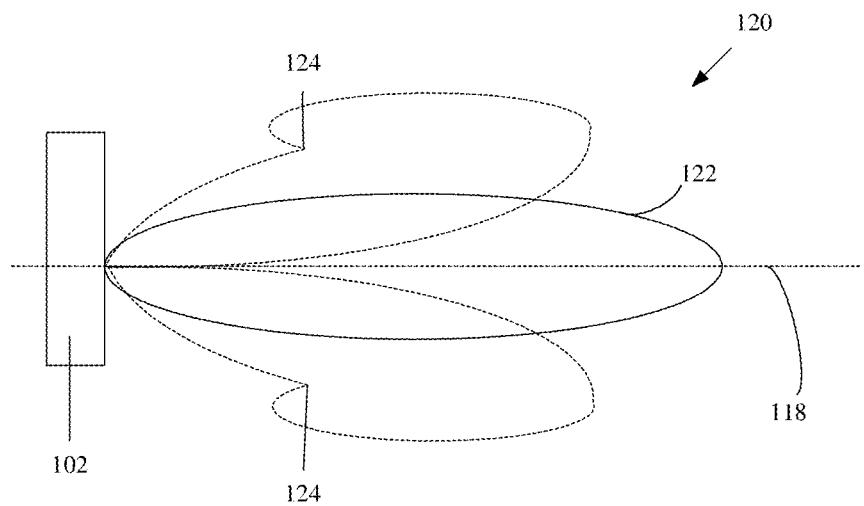
FIG. 1B is a schematic diagram of an antenna pattern of the antenna system.

To receive radiation in these two types of patterns, the antenna system 102 has an antenna pattern 120 including a main beam pattern 122 associated with the sum pattern, and two orthogonal null beam patterns 124 associated with the difference patterns corresponding to the vertical and azimuthal angles (an example sum pattern and one of the example difference patterns are shown in FIG. 1B).

Over a substantial part of the angular range corresponding to the first nulls of the main beam pattern 122, the relative magnitudes and phases of the voltages received from the null beam patterns 124 and the main beam pattern 122 contain information about the magnitude and direction of the angular pointing error between the antenna boresight 118 and the target 104.

Reflector Subsystem 200

Figure 2:
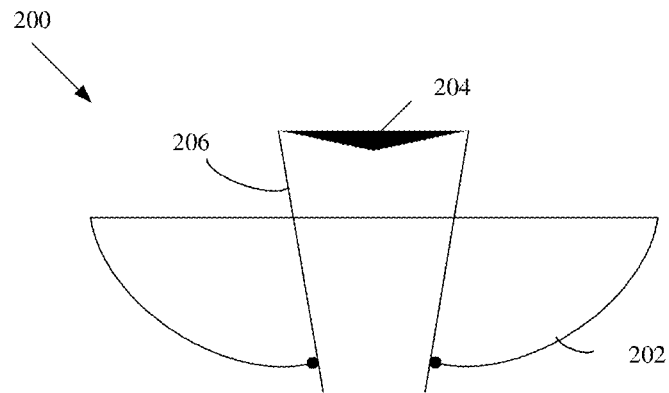
FIG. 2 is a schematic diagram of a reflector subsystem of the antenna system.

The reflector subsystem 200 includes two reflectors (namely a main reflector 202 and a sub reflector 204), e.g., mounted in a displaced-axis Gregorian configuration, for receiving and focussing emitted signals from the target 104, as shown in FIG. 2. (Having a displaced axis means that the main reflector 202 has a ring focus rather than a single point of focus on the sub reflector 204.)

The sub reflector 204 is mounted to the main reflector 202 using a support 206. The support 206 can include support struts and/or a monopod support. The sub reflector 204 is mounted within an arc defined by the radius of the main reflector 202 (i.e., the maximum distance of the sub reflector 204 from the centre of the main reflector 202 is equal to or less than the radius of the main reflector 202) so the radius of the radome 114 is no larger than that required to fit the main reflector 202 across its necessary range of motion.

The reflector subsystem 200 permits broadband operation of the antenna system 102. For example, the reflector subsystem can operate at widely separated frequency bands, such as one band at about 20 GHz and a different band at about 30 GHz (as used in Ka-band communications). The reflector subsystem 200 is configured to receive radiation from both the main beam pattern 122 and the null beam patterns 124, and to direct radiation from these beam patterns into the feed subsystem 300.

Feed Subsystem 300

Figure 6A:
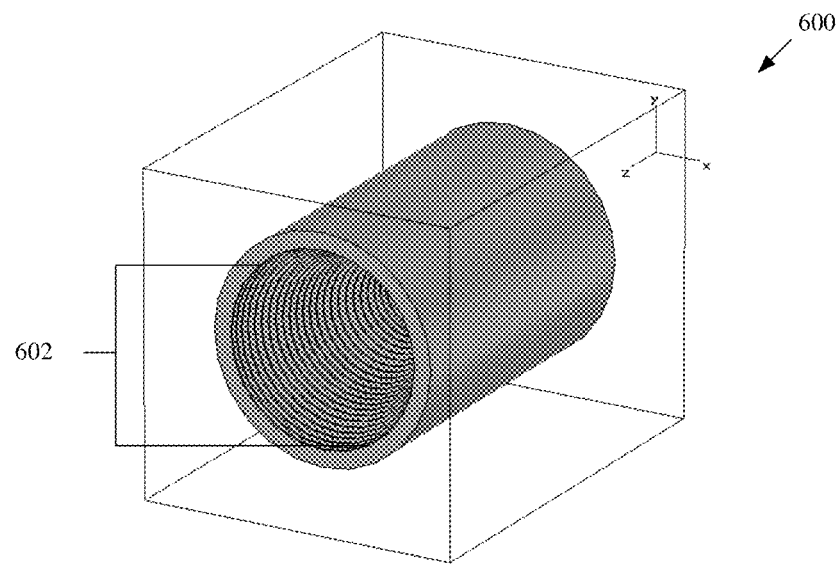
FIG. 6A is a perspective view of an electromagnetic (EM) model, with a vacuum background material, of a horn of the feed subsystem.
Figure 6B:
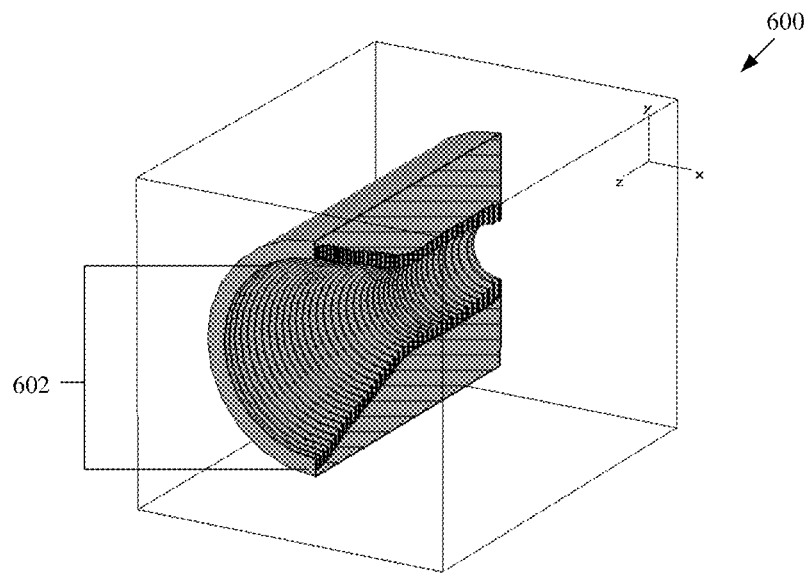
FIG. 6B is a cross-sectional perspective view of the EM model, with a vacuum background material, of the horn.

The feed subsystem 300 includes a horn 600 configured to guide multimodal and multiband signals between the reflector subsystem 200 and the waveguide components in the remainder of the feed subsystem 300. The horn 600 includes a frustoconical bore (i.e., a central guide shaped like a portion of a cone) and a corrugated interior surface, as shown in FIGS. 6A and 6B.

Figure 3A:
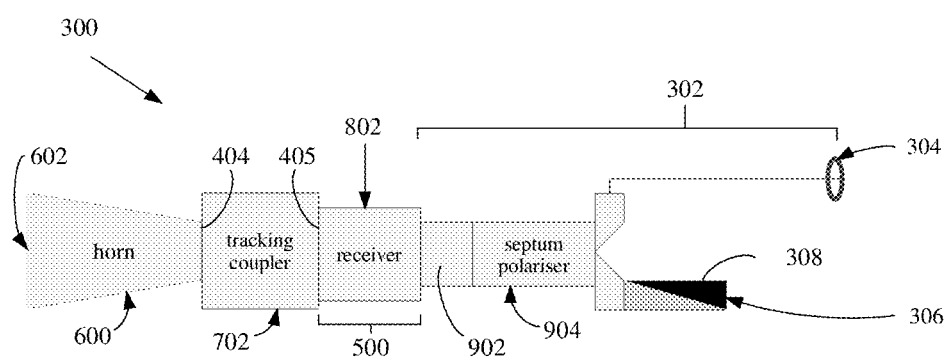
FIG. 3A is a schematic diagram of a feed subsystem of the antenna system.

The horn 600 receives radiation focussed by the sub reflector 204 in its horn input port 602, and guides this radiation to an input port 404 (referred to as "port 1") of a tracking coupler 702 of the feed subsystem 300, as shown in FIG. 3A.

The horn 600 guides transmit radiation from the remainder of the feed subsystem 300 (originating in the transmit subsystem 302) to the reflector subsystem 200.

The horn 600 supports a central fundamental mode in the form of a TE11 mode (i.e., the fundamental mode of a circular waveguide), and a non-central higher-order mode in the form of a TE21 mode (i.e., a higher-order mode of a circular waveguide), both propagating through the horn 600 to the input port 404 of the tracking coupler 702.

The diameter of the horn input port 602 defines an upper limit on the higher-order circular waveguide modes that can pass into the feed subsystem 300. These diameters are selected to block unwanted higher-order modes, e.g., any modes above TE21 at the selected operating frequencies (e.g., in the Ka band at about 20 GHz), in the circular horn 600.

The feed subsystem 300 includes the tracking coupler 702, which receives the fundamental and higher-order mode signals (i.e., the TE11 and the TE21 signals respectively) from the horn 600 at its input port 404. The tracking coupler 702 uses the higher-order mode signals to generate tracking signals (i.e., the difference signals for monopulse tracking) for use in controlling the antenna system 102 to track the target 104. The tracking coupler 702 allows the fundamental mode signals to pass through its output port 405 (referred to as "port 3") to a receive coupler 802 of a receive subsystem 500.

The receive coupler 802 is configured to extract receive signals from the received TE11 mode signals. The fundamental mode signals are used to generate received communications signals for the communications processing system 116 and for generating tracking reference signals (i.e., the sum signals for monopulse tracking) for use in controlling the antenna system 102 to track the target 104.

Figure 5:
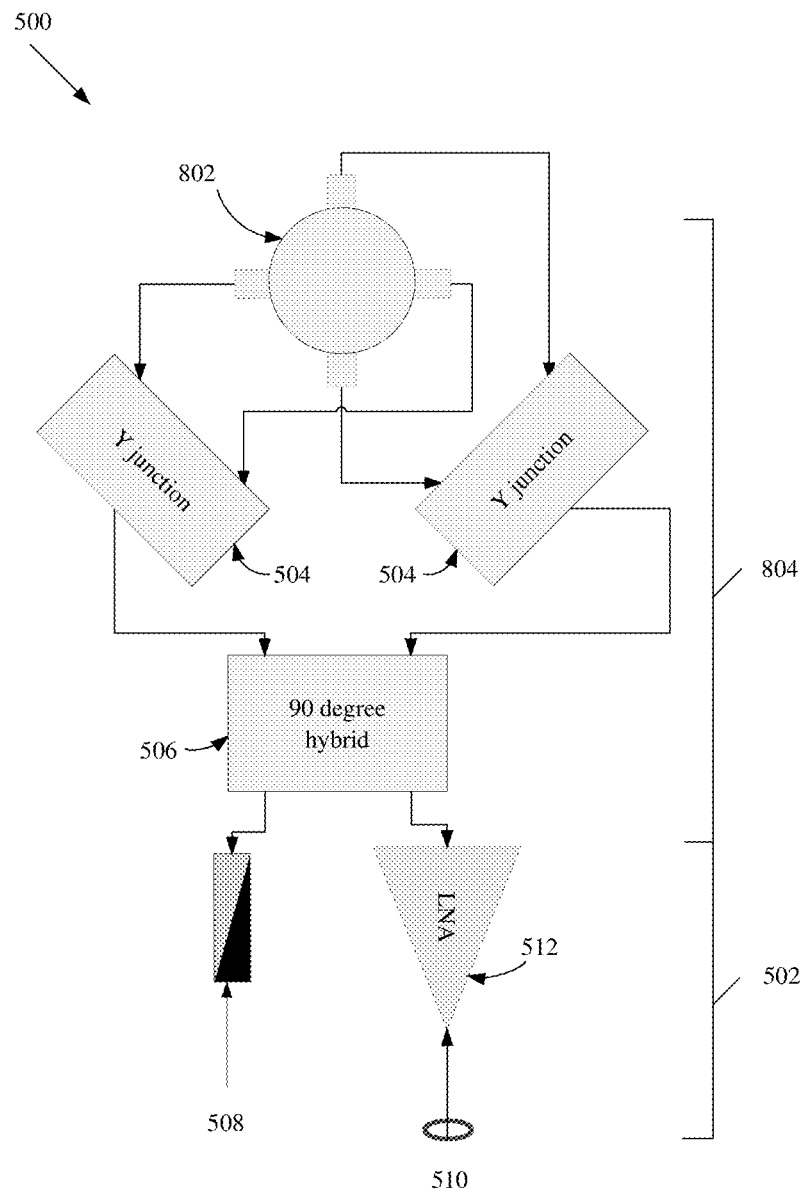
FIG. 5 is a schematic diagram of a receive subsystem of the antenna system.

For frequency re-use, the receive subsystem 500 can be configured to receive using both polarisations simultaneously (i.e., requiring an LNA 512 for each receiver port end 502, shown in FIG. 5, and corresponding chains).

The feed subsystem 300 includes a transmit subsystem 302 which receives electronic transmit signals through one or more transmit ports. The transmit subsystem 302 includes a septum polariser 904 and a circular-to-square transformer 902. The transmit subsystem 302 sends propagating electromagnetic signals back through the other portions of the feed subsystem 300—namely through the receive coupler 802, the tracking coupler 702 and the horn 600—to the reflector subsystem 200 for transmitting signals (e.g., RADAR or SATCOM signals) to the target 104.

The transmit subsystem 302 includes two transmit ports: a first transmit port 304 and a second transmit port 306, as shown in FIG. 3A. The second transmit port 306 can be terminated with a matched load termination 308, as shown in FIG. 3A, or alternatively can be connected to an electronic input for transmission of dual-polarisation signals for frequency re-use. In some applications, the ports 304, 306 can be fitted with transfer switches which allow the transmit polarisations to be switched.

The transmit subsystem 302 can be configured to transmit right hand circular polarised (RHCP) signals from the first transmit port 304, and left hand circular polarised (LHCP) signals from the second transmit port 306. The frequency of the transmit signals can be in the Ka band at about 30-31 GHz.

For frequency re-use, the transmit subsystem 302 can be configured to transmit on a single polarisation selectable by a transfer switch.

Figure 9A:
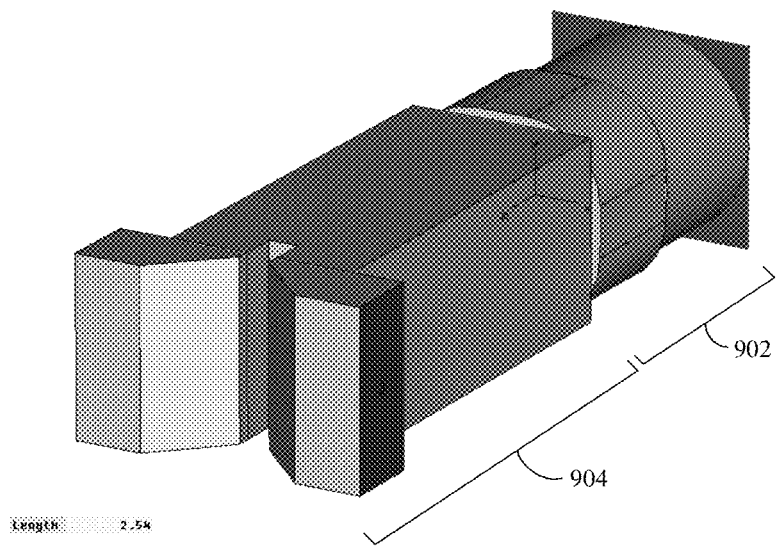
FIG. 9A is a perspective view of an EM model, with a metal background material, of a transformer and a septum polariser of the feed subsystem.
Figure 9B:
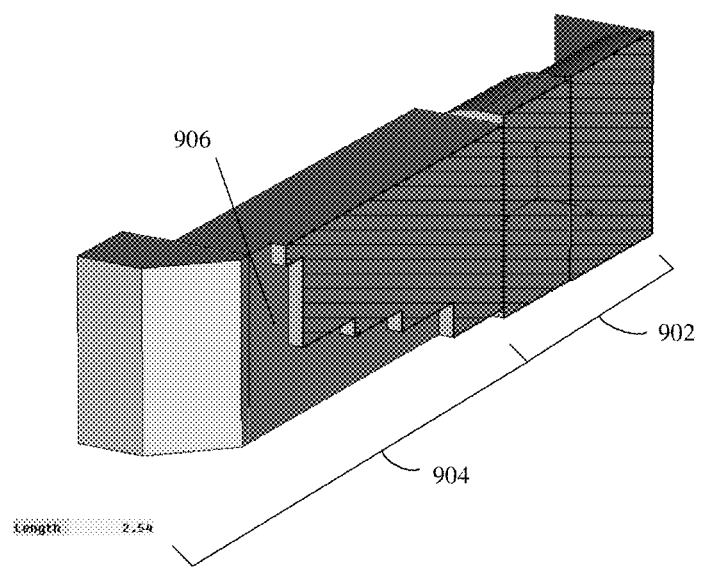
FIG. 9B is cross-sectional perspective view of an EM model, with a metal background material, of the transformer and the septum polariser.

The septum polariser 904 includes a stepped metal septum 906, as shown in FIG. 9B, for generating dual circular polarisation across the transmit frequency range (e.g., the Ka band at about 30-31 GHz).

The transformer 902 can be standard circular-to-square waveguide transformer to transform the transmit signals from the square/rectangular waveguide components of the transmit subsystem 302 to circular or round waveguide components of the receive coupler 802, the tracking coupler 702 and the horn 600.

Square Feed Subsystem 300B

Figure 3B:
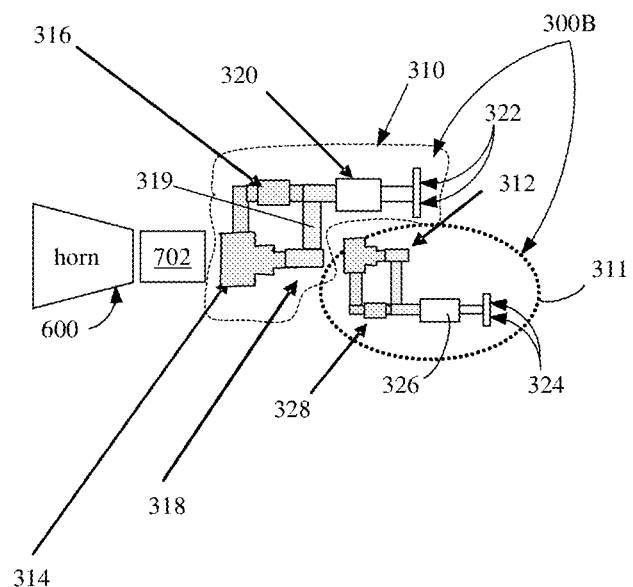
FIG. 3B is a schematic diagram of an alternative square waveguide feed subsystem.

In an alternative to the feed subsystem 300, a square feed subsystem 300B includes an equivalent horn 600 and tracking coupler 702, but alternative components for the receive coupler 802 and the transmit subsystem 302, as shown in FIG. 3B. In the square feed subsystem 300B, the tracking coupler 702 passes the receive signals to a square receive section 310, which detects the receive signals (including the tracking sum signal) for the communications processing system 116 and the tracking controller 112. The square feed subsystem 300B includes a square transmit section 311 which generates the transmit signals for transmission through the square receive section 310, the tracking coupler 702 and the horn 600.

The square receive section 310 includes a vertical polarisation section 314 which extracts the vertical polarisation of the fundamental mode signals (e.g., the TE01 or TE10 signals) at the receive frequencies (e.g., about 20 GHz) through a port in a direction generally perpendicular to the propagation axis of the square feed subsystem 300B. The vertical polarisation section 314 passes the extracted signals to a phase compensator 316, as shown in FIG. 3B. The square receive section 310 includes a horizontal polarisation section 318 which receives the horizontal polarisation of the fundamental mode signals (i.e., the orthogonal polarisation to the first-received vertical polarisation) at the receive frequencies (e.g., about 20 GHz). The horizontal polarisation section 318 extracts the horizontal polarisation of the fundamental mode signals through a side port into a waveguide 319 aligned perpendicular to the central axis of the square feed subsystem 300B. The vertical and horizontal polarised fundamental mode signals are combined using a 3-decibel (dB) hybrid 320, which passes the combined signals to RHCP and LHCP receive ports 322. The receive ports 322 are connected to respective low-noise amplifiers (LNAs) which carry electronic signals representing the receive signals to the communications processing system 116, and electronic signals representing the tracking sum signal to the tracking controller 112.

The square transmit section 311 is configured in an equivalent manner to the square receive section 310, but sized for the transmit frequency band (e.g., about 30 GHz). The square transmit section 311 receives electronic signals for transmission at its RHCP and LHCP transmit ports 324, and the transmit signals in the two polarisations are split at a 3-dB hybrid 326 into two respective waveguide arms, which reconnect to the main guide (including sections 314, 318) of the square feed subsystem 300B, as shown in FIG. 3B. The phases of the signals in the two waveguide arms are matched using a phase compensator 328 in one of the arms, and combined in a square transmit OMT 312.

The square feed subsystem 300B uses the circular tracking coupler 702 which can be connected directly, or via a circular-to-square transformer, to the remainder of the feed that uses square and rectangular waveguide components. The square feed subsystem 300B would typically be longer from the horn 600 to the transmit ports 324 than the feed subsystem 300, and thus may be used in applications where more space is available.

Receive-Only Feed Subsystems 300C and 300D

The antenna system 102, in certain applications, can be configured to be receive-only, i.e., without the transmit subsystem 302. In a receive-only system, the horn 600 can be replaced by a single-band horn 330 as only the receive band needs to be passed. The tracking coupler 702 still extracts signals for generating the tracking control (e.g., the difference signal for monopulse tracking), but the tracking combiner network does not require low-pass filters, and can thus be replaced with a filter-free combiner network 708. The filter-free combiner network 708, as shown in FIG. 7J, is without transmit-reject filters 710. As there is no need to avoid generation of higher-order mode signals in the waveguide components, a cosine-squared transformer or taper 706 in the tracking coupler 702 can be replaced by a step transformer 722, as shown in FIG. 7J.

Figure 3C:
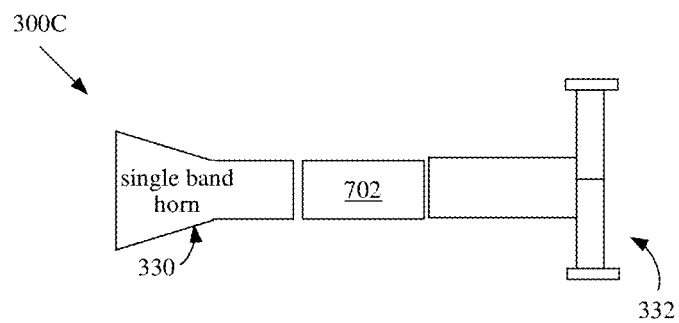
FIG. 3C is a schematic diagram of a receive-only feed system.
Figure 3D:
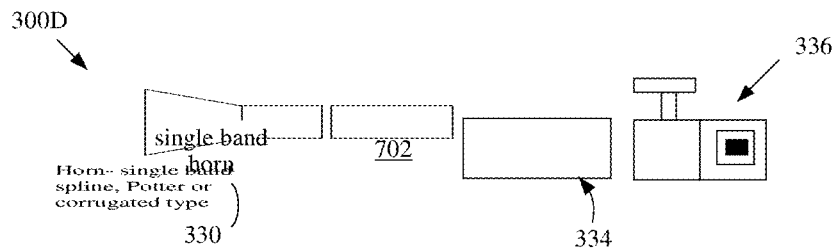
FIG. 3D is a schematic diagram of an alternative receive-only feed subsystem.

In a receive-only feed subsystem 300C, the receive coupler 802 can be replaced by a septum polariser 332 with bifurcation, as shown in FIG. 3C. In an alternative receive-only feed subsystem 300D, the receive coupler 802 can be replaced by a polariser 334 (which can be a corrugated polariser, a circular polariser with side plates, or a dielectric vane), and a receive OMT 336, as shown in FIG. 3D.

Tracking Subsystem 400

Figure 4:
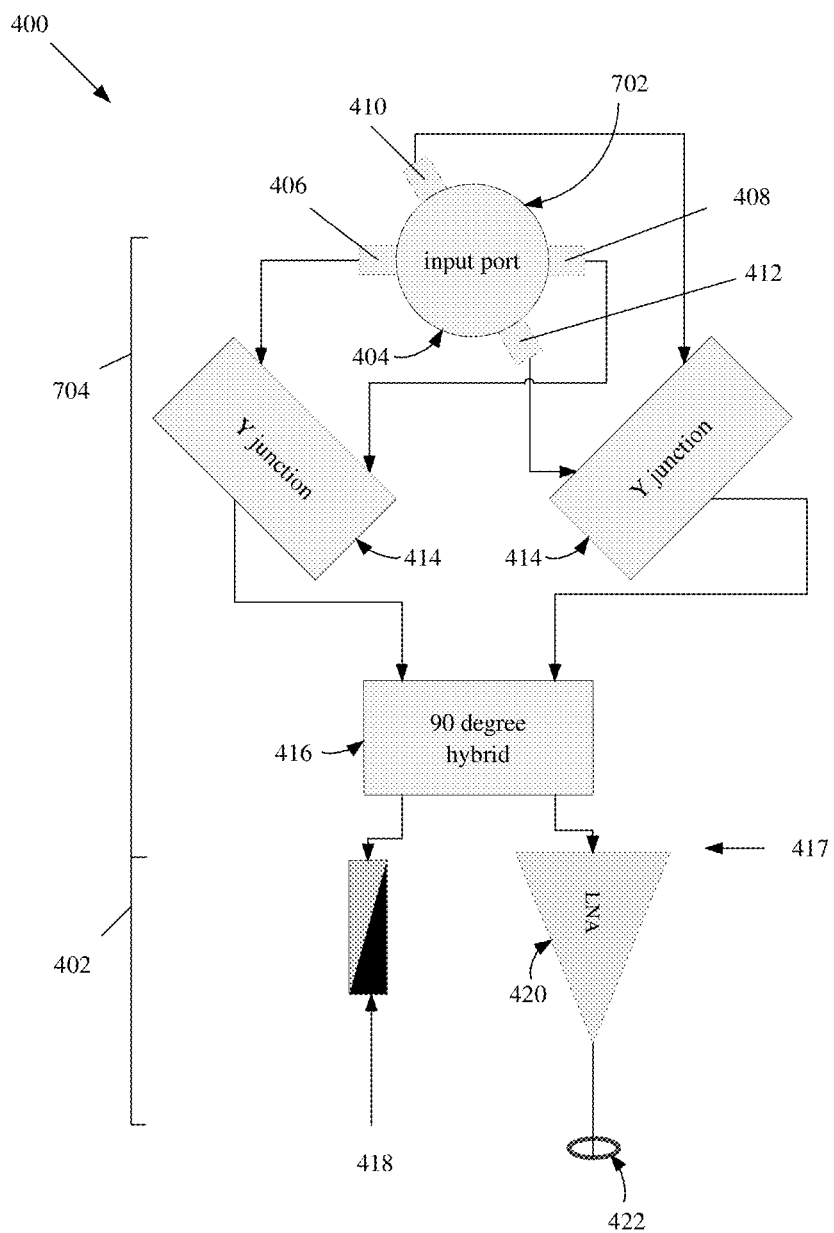
FIG. 4 is a schematic diagram of a tracking subsystem of the antenna system.

The antenna system 102 includes a tracking subsystem 400, which includes the tracking coupler 702, the tracking combiner network 704 and tracking port ends 402, as shown in FIG. 4.

Figure 7A:
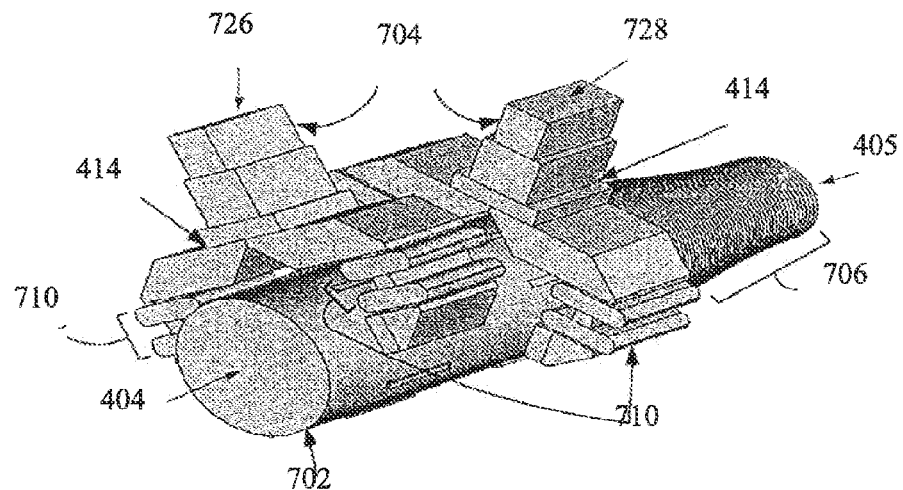
FIG. 7A is a perspective view of an EM model, with a metal background material, of a tracking coupler, a tracking combiner network and a taper of the feed subsystem.

The tracking coupler 702 is in the form of a four-port single slot coupler (which may be a form of "turnstile junction") with opposed pairs of ports (formed by pairs of diametrically opposed slot couplers, each having a slot in the wall of the circular main waveguide of the tracking coupler 702) aligned at 45 degrees to each other, as shown in FIGS. 4 and 7A. Each slot coupler includes a single slot, aligned longitudinally along the tracking coupler. The pairs of ports are located along the sides of the main central waveguide chamber of the tracking coupler 702 for extracting the tracking signals from the higher-order mode signals propagating in through the input port 404.

A first pair of the ports includes a first left port 406 and a first right port 408, which are directly diametrically opposed to each another across the central axis of the tracking coupler 702. The first pair of ports extracts the higher-order mode signals in a first polarisation. A second pair of the ports includes a second left port 410 and a second right port 412, which are also directly diametrically opposed to each other across the central axis of the tracking coupler 702. The second pair of ports extracts the higher-order mode signals in a second polarisation, wherein the second polarisation is different from and orthogonal to the first polarisation.

The pairs of ports in the tracking coupler 702 are offset in angle around the circumference of the tracking coupler 702, and offset in distance along the length of the tracking coupler 702. The pairs of ports are spaced along the length of the tracking coupler 702 by about half a wavelength of the higher-order mode signals (i.e., $\lambda_g/2$). The pairs of ports are offset along the length of the tracking coupler 702 by a minimum length between each pair of ports 406, 408 and 410, 412 and associated combiners in the form of E-plane Y junctions 414. The minimum length offset allows any fundamental mode signals (e.g., corresponding to the main beam pattern 122 and intended for the receive subsystem 500) that couple into the side ports 406, 408, 410, 412 to be re-injected back into the central circular waveguide of the tracking coupler 702 with the correct phase (i.e., in phase).

The tracking combiner network 704 includes waveguide components that carry the extracted signals from the four ports 406, 408, 410, 412 through four respective transmit-reject filters 710 connected to the ports 406, 408, 410, 412, as shown in FIG. 7A. The transmit-reject filters 710 are configured to reject radiation at transmit frequencies (i.e., the frequencies generated by the transmit subsystem 302, e.g., at 30 GHz) from entering the tracking combiner network 704. Each of the transmit-reject filters 710 is a low-pass corrugated waveguide filter that includes two or more corrugations. Each arm has a low-pass filter, and each filter has a plurality of corrugations. The transmit-reject filters 710 can be conventional corrugated filters with two or more corrugations: having more corrugations improves the rejection of the transmit signals from the tracking combiner network 704, but takes more physical space. The transmit-reject filters 710 are positioned at a selected length from each corresponding slot in the central chamber of the tracking coupler 702. The slot-to-filter distance is selected to cause minimal disruption to the transmit signals and can be selected by optimising the slot-to-filter distance for an optimal return loss of the tracking coupler 702 for the transmit mode (e.g., using electromagnetic simulation software). The tracking combiner network 704 includes square/rectangular waveguide components for guiding the extracted signals from the two opposed ports in each pair, and combining them in a 180-degree hybrid (or a 180-degree hybrid combiner) in the form of one of the E-plane Y junctions 414, as shown in FIGS. 4 and 7A. Although magic T couplers may be used as the 180-degree hybrid combiners, instead of the Y junctions 414, the Y junctions 414 may be preferable if only the sum signal from each combiner is being used because the Y junction 414 can be shorter than a magic T. Each E-plane Y junction 414 has substantially equal length legs and is symmetrically formed around the tracking coupler 702. Each E-plane Y junction 414 is connected to the tracking combiner network 704, and the length of waveguide from each port 406, 408, 410, 412 to the junction of a corresponding one of the Y junctions 414 is selected such that each Y junction 414 adds the higher-order mode propagating electromagnetic fields (e.g., TE21) from the ports in each pair in anti-phase with each other. The higher-order tracking modes come in at the ports in anti-phase so they need to be combined in anti-phase. In contrast, any fundamental non-tracking signals (e.g., TE11) that couple into one of the legs of one of the E-plane Y junctions 414 will be in phase, so will be reflected back by the Y junction. By reflecting back the non-tracking signals, signal loss and attenuation of the non-tracking signals in the tracking coupler 702 is reduced, thus leaving more of the non-tracking signals for detection in the receive subsystem 500.

The output port 726 of the first E-plane Y junction 414 can be referred to as port 4 (a difference port), and the output port 728 of the second E-plane Y junction 414 can be referred to as port 2 (also a difference port).

The tracking combiner network 704 includes waveguide components providing a 90-degree hybrid 416 (connected to the combiner output ports 726, 728 of the Y junctions 414, as shown in FIG. 4) to combine the signals from the two E-plane Y junctions 414. The 90-degree hybrid 416 is in the form of a branch guide coupler 714 (as shown in FIGS. 7G and 7H), or alternatively a slot coupler.

Between each E-plane Y junction 414 and the branch guide coupler 714, the tracking combiner network 704 includes phase compensators 716 in the form of lengths of waveguide, to equalise the phase of the signals extracted from each pair of ports. The phase compensators 716 are connected between each Y junction 414 and the branch guide coupler 714, as shown in FIGS. 7G and 7H. The phase compensators 716 include rectangular waveguides (as shown in FIGS. 7G and 7H) with equivalent propagation constants to the main circular waveguide of the tracking coupler 702. In particular, the rectangular waveguides of the phase compensators 716 are configured to have substantially the same cutoff wavelength as the circular waveguide of the tracking coupler 702, thus compensating for the different distances travelled by signals in the different orthogonal polarizations in the main circular waveguide.

The combiner network 704 can include step transformers (in the form of rectangular waveguide sections of different dimensions) to transform between different waveguide sizes of the Y junctions 414 and the branch guide coupler 714.

The tracking port ends 402 terminate the tracking output ports 417 of the 90-degree hybrid 416 with a waveguide termination for the first difference port 418 (e.g., for RHCP signals) and a LNA 420 for the second difference port 422 (e.g., for LHCP signals). Electronic signals representing a tracking difference signal—further described hereinafter with reference to FIGS. 10B, 10C, 10D and 10E—are electronically transmitted from the tracking port ends 402 to the tracking controller 112 for controlling the antenna system 102 to track the target 104.

Receive Subsystem 500

The antenna subsystem 102 includes a receive subsystem 500, which includes the receive coupler 802, the receive combiner network 804 and receiver port ends 502, as shown in FIG. 5. The receive coupler 802 is in the form of a microwave four-port junction, with diametrically opposed pairs of ports arranged at 90 degrees to each other, as shown in FIGS. 5 and 8.

Figure 8:
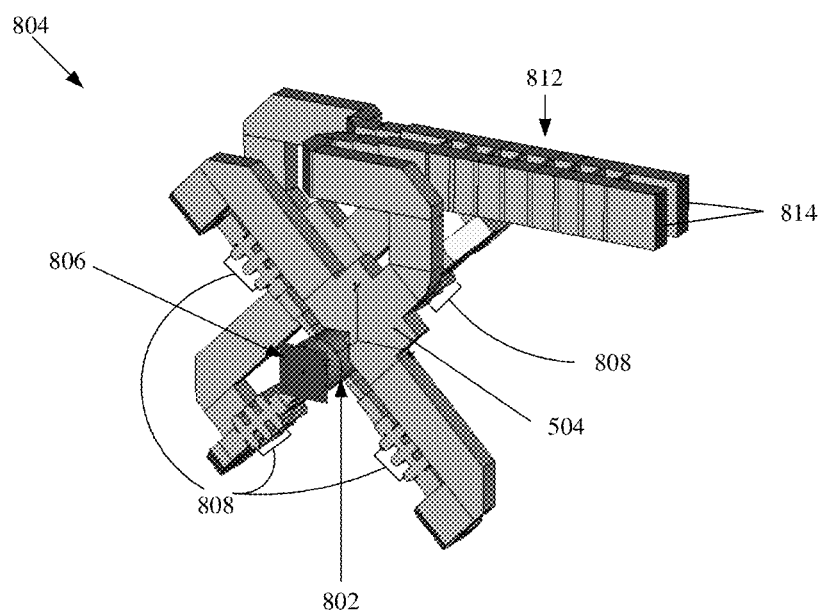
FIG. 8 is a perspective view of an EM model, with a metal background material, of a receive subsystem and a receive combiner network of the feed subsystem.

The receive coupler 802 has a receive input port 806 for receiving electromagnetic signals propagating in the fundamental mode (the TE11 mode) from the tracking coupler 702, as shown in FIG. 8. The pairs of diametrically opposed ports in opposed sides of a central chamber of the receive coupler 802 are configured to extract receive signals from the fundamental mode signals.

Unlike the pairs of ports in the tracking coupler 702, the pairs of ports in the receive coupler 802 are located at the same length along the central chamber of the receive coupler 802.

The receive combiner network 804 includes waveguide components connected to and leading from each port of the receive coupler 802. Transmit-reject filters 808 (in the form of corrugated low-pass filters), equivalent to the transmit-reject filters 710 of the tracking combiner network 704, are mounted in the receive combiner network 804 in the waveguides leading from each of the ports of the receive coupler 802, as shown in FIG. 8. The transmit-reject filters 808 are configured to reject radiation at transmit frequencies (i.e., the frequencies generated by the transmit subsystem 302, e.g., at about 30 GHz) from entering the receive combiner network 804.

The receive combiner network 804 includes a 180-degree hybrid in the form of an H-plane Y junction 504 connected to both ports in each pair, as shown in FIGS. 5 and 8. The signals extracted in each pair of ports are combined in phase in the H-plane Y junction 504.

Each H-plane Y junction 504 has substantially equal length legs (between the junction 504 and each port) and is symmetrically formed around the receive coupler 802.

The receive combiner network 804 includes a 90-degree hybrid 506 in the form of a branch guide coupler 812, connected to both Y junctions 504, as shown in FIG. 8, for combining the signals from each Y junction 504, and delivering them to receiver output ports 814. Received signals from the receiver output ports 814 are delivered to the receiver port ends 502, which include a first receiver port 508, in the form of a termination at the receive frequencies (e.g., for RHCP signals) and a second receiver port 510 (e.g., for LHCP signals), which receives amplified signals from an LNA 512 connected to one of the receiver output ports 814, as shown in FIG. 5.

The receive signals from the receiver port ends 502 are transmitted electronically to communications processing system 116 and the tracking controller 112. The receive signals include the tracking sum signals at both polarisations, which are used by the tracking controller 112 to control the antenna system 102 to track the target 104. The receive signals include the data channel signals, which represent information from the target 104, such as data communication signals (e.g., for satellite communications) and/or detection and ranging data.

Modes in Tracking Subsystem 400 and Receive Subsystem 500

Figure 7B:
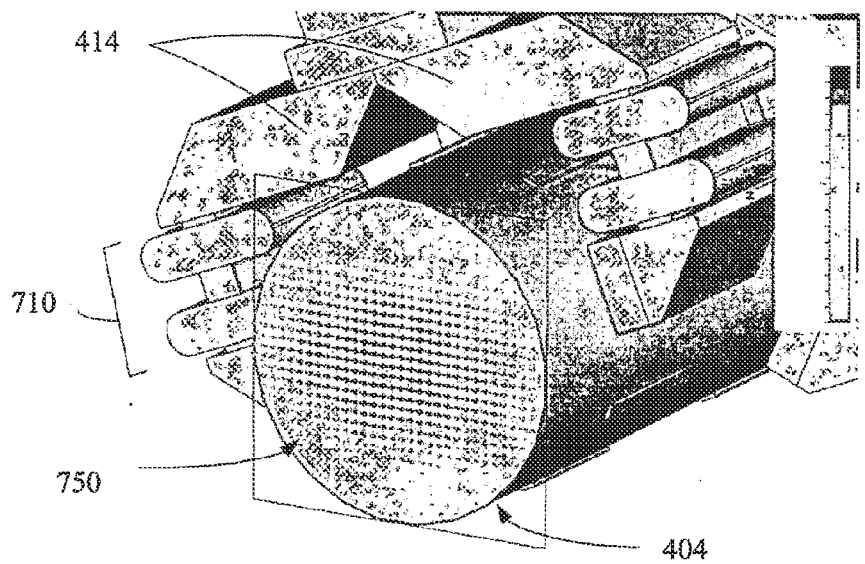
FIG. 7B is a perspective view of the EM model, with a metal background material, of the tracking coupler showing the electric field of a TE11 horizontal mode at an input port.
Figure 7C:
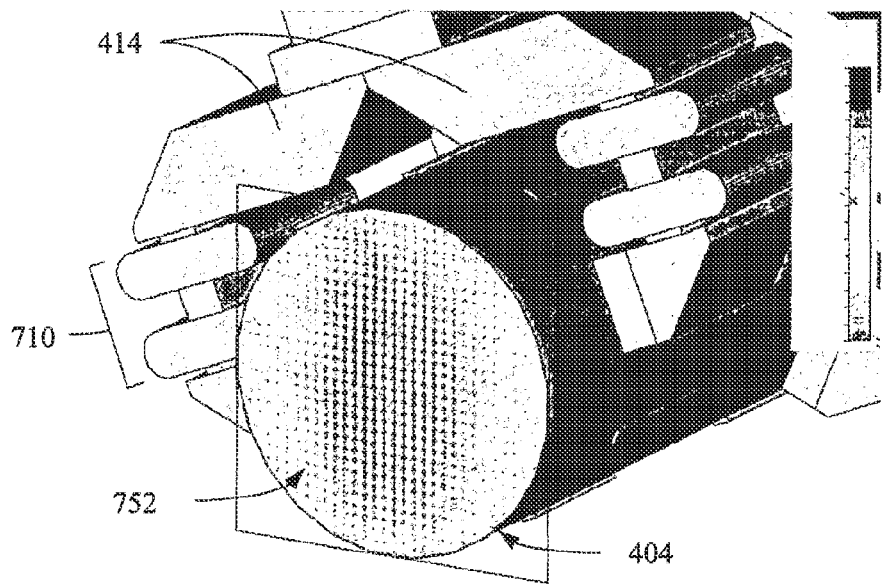
FIG. 7C is a perspective view of the EM model showing the electric field of a TE11 vertical mode at the input port.

The fundamental mode signals can be in a TE11 horizontal mode 750, shown in FIG. 7B, a TE11 vertical mode 752, shown in FIG. 7C, and/or right-hand or left-hand circularly polarised TE11 modes.

Figure 7D:
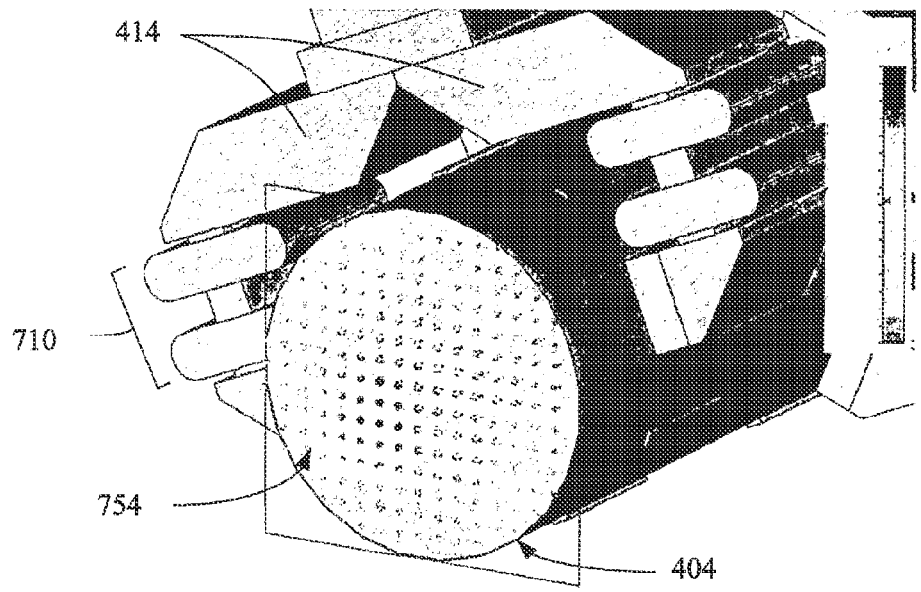
FIG. 7D is a perspective view of the EM model showing the electric field of a TM01 mode at the input port.
Figure 7E:
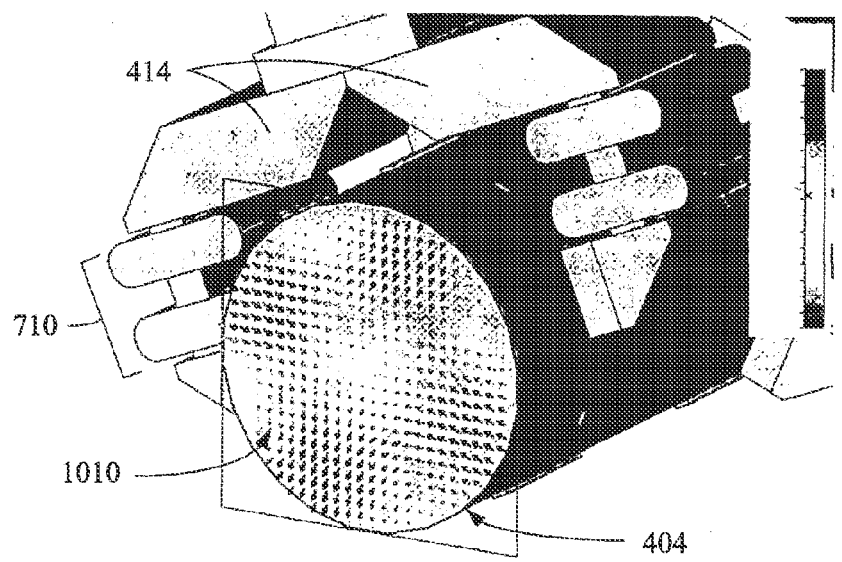
FIG. 7E is a perspective view of the EM model showing the electric field of a first TE21 mode at the input port.
Figure 7F:
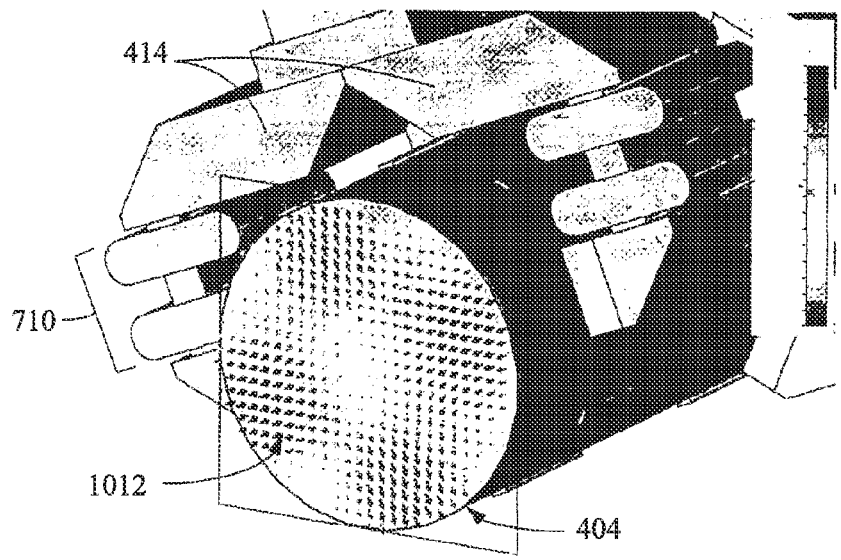
FIG. 7F is a perspective view of the EM model showing the electric field of a second TE21 mode at the input port.

Power can couple into the TM01 mode 754 of the tracking coupler 702, as shown in FIG. 7D, but the tracking coupler 702 is configured such that power in this mode generates no substantial signal at the tracking output ports 417. The slots of the ports 406, 408, 410, 412 (formed by the slot couplers) are configured to be longitudinally aligned to the transmission axis of the tracking coupler 702 to not couple the TM01 mode into the tracking combiner network 704.

The slots of the ports (formed by the slot couplers) of the receive subsystem 500 are also configured to be longitudinally aligned to the transmission axis of the receive coupler 802 to not couple the TM01 mode into the receive combiner network 804.

The slots in the tracking coupler 702 and the receive coupler 802 are generally about half a wavelength in length (for the tracking and receive wavelengths/frequencies, e.g., at about 20 GHz). The slots have a small height (i.e., in a circumferential direction about the transmission axis of the tracking coupler 702 or the receive coupler 802) that is sufficient to allow coupling of the required signals (e.g., from the TE21 or TE11 modes) while not coupling a significant fraction of the TM01 mode or distorting the modes coupling through the tracking coupler 702 or the receive coupler 802. For example, the height of each slot in a Ka-band system can be about 1 mm.

Taper 706

The feed subsystem 300 includes the taper 706 between the tracking coupler 702 and the receive coupler 802. The taper 706 is formed as a cosine-squared taper (also referred to as a cosine taper). The taper 706 provides a reflection plane for the tracking coupler 702 by reflecting any tracking mode signals that pass through the tracking coupler 702 back into the tracking coupler 702 with the correct phase to improve the efficiency of tracking mode signals coupling into the ports of the tracking coupler 702. The reflected tracking mode signals are in phase with the energy arriving at the input port 404 at the slots of the ports 406, 408, 410, 412.

Figure 7G:
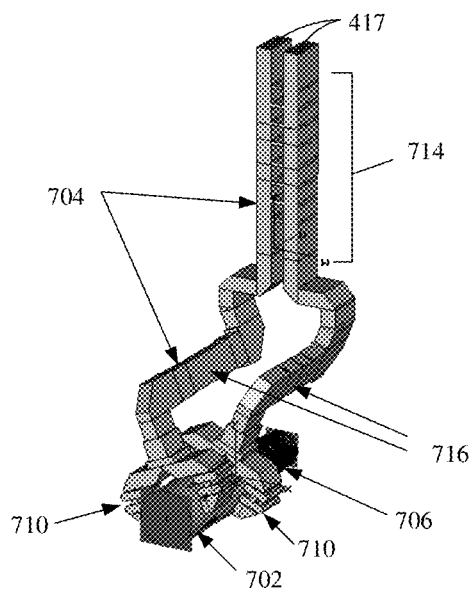
FIGS. 7G and 7H are perspective views of an EM model, with a metal background material, of the tracking coupler and the tracking combiner network including phase compensators and a branch guide coupler.
Figure 7H:
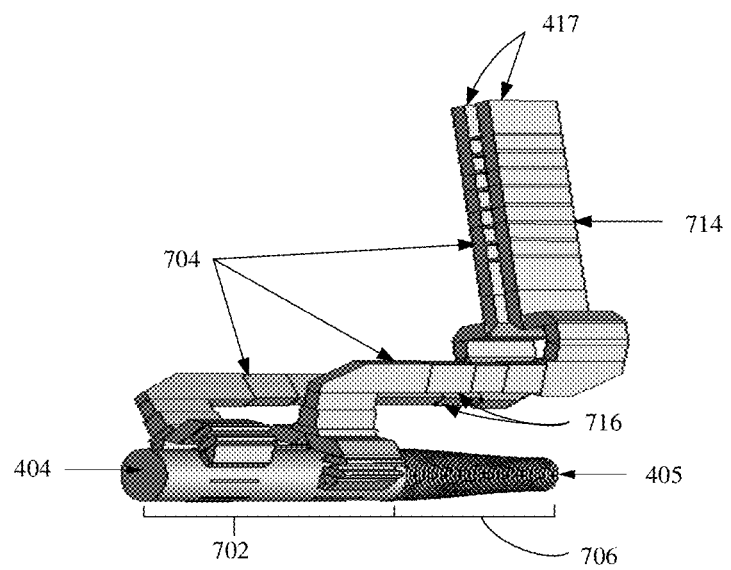
Figure 7I:
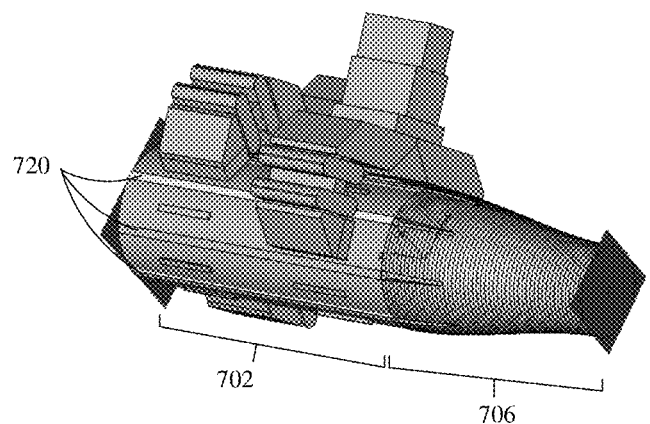
FIG. 7I is a perspective view of an EM model, with a metal background material, of the tracking coupler and the taper including mode guide ridges.
Figure 7J:
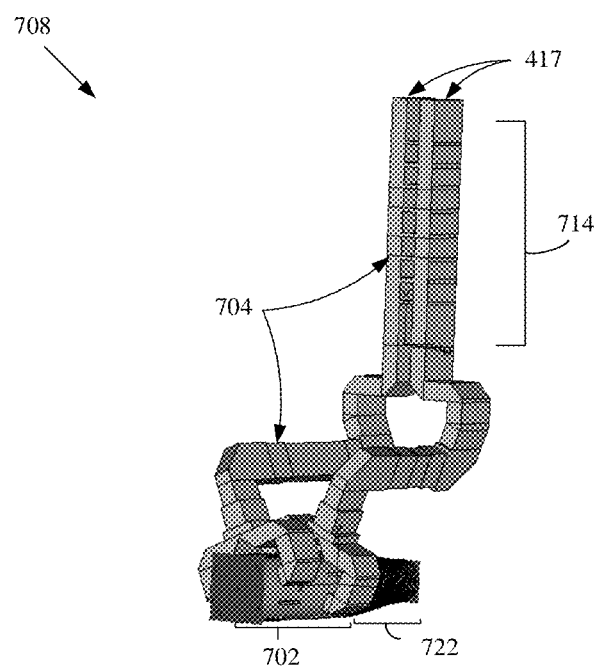
FIG. 7J is a perspective view of an EM model, with a metal background material, of the tracking coupler, the taper, and a filter-free tracking combiner network.

The taper 706, as shown in FIGS. 7A, 7G and 7I, has a smooth transition between the diameter of the tracking coupler 702 and the receive coupler 802. The taper 706 is configured to reflect the higher-order tracking mode signals (e.g., TE21 at about 20 GHz) while passing the fundamental receive mode signals (e.g., TE11 at about 20 GHz and above), without generating unwanted higher-order circular waveguide modes (e.g., the TM11 mode), particularly at higher frequencies (e.g., at higher frequencies, such as about 30 GHz) which may fall in the transmission frequency band. The cosine-squared taper 706 can be beneficial in Ka-band systems because the frequency spacing between the transmit and receive frequencies is larger than in some other bands.

In systems where no transmit subsystem 302 is used, e.g., the feed subsystems shown in FIGS. 3C and 3D, the taper 706 can be replaced with a step transformer because there in no need to pass higher frequencies of a transmit band back through the feed system.

Ridged Waveguides

The tracking coupler 702 and the taper 706 can include ridged waveguides configured to couple the receive mode signals (TE11) through the tracking coupler 702 more tightly and with better efficiency. These ridged waveguides are configured to lower the cut-off frequency of the tracking mode signals (i.e., the TE21 modes) and the receive mode signals (i.e., the TE11 mode). The TE11 mode couples more tightly to the ridges than the TE21 mode, so the TE11 mode passes through the coupler with a reduced level of interaction with the coupling slots 406, 408, 410, 412 while the strong coupling of the slots to the TE21 mode is maintained. For the TE11 mode, the TE11 currents mainly flow along the ridges, thus the coupling slots 406, 408, 410, 412 do not cut many of the current lines associated with the TE11 mode; in contrast, for the TE21 mode, a substantial portion of the TE21 currents flow circumferentially, thus the TE21 current lines have strong circumferential components which are cut by the coupling slots 406, 408, 410, 412. The ridge structure can provide enhanced tracking frequency bandwidth without degrading the main receive and transmit functions of the antenna system 102.

The ridged waveguides include a plurality of waveguide ridges 720 which are aligned along the direction of propagation of the signals through the tracking coupler 702, and project into the interior chamber of the tracking coupler 702, as shown in FIG. 7I. The waveguide ridges 720 are equally circumferentially spaced around the chamber of the tracking coupler 702 and extend into the taper 706, as shown in FIG. 7I.

The ridged waveguide can include eight equally circumferentially spaced ridges (thus forming an "octal coupler"), which corresponds to having four ridges for each of the two orthogonal polarisations of the tracking mode signals. Having only four ridges can cause unequal coupling of the two orthogonal tracking mode signals, which can cause the two tracking modes to have different phase velocities and thus significantly degrade the tracking performance. Higher numbers of ridges can be provided, e.g., 16 or 24 or 32 etc., in multiples of eight, or at least providing equal phase velocities for both orthogonal tracking modes.

The eight ridges 720 in the "octal coupler" can improve the bandwidth of the tracking coupler 702 to allow for tracking to the bottom/lowest frequencies of the Ka band, e.g., the bandwidth can be improved by almost a factor of two, and/or the cutoff frequency can be lowered by about 20%.

Figure 7K:
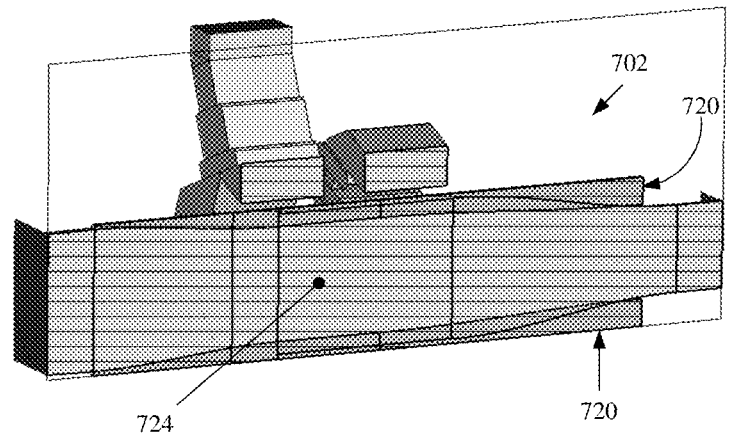
FIG. 7K is a cross-sectional view of an EM model, with a metal background material (apart from the ridges), of an octal ridge mode coupler.

The ridges 720, projecting into a main body 724 of the tracking coupler 702, taper away (i.e., reduce in height gradually and continuously) at both ends of the coupler 702 leaving normal circular waveguide inputs and outputs at the ends of the ridges 720, as shown in FIG. 7K (which is a cross-sectional view taken through the centre of two ridges, with the main body 724 shown as a vacuum and the ridges 720 shown in metal).

Operation Process 1000

In an operation process 1000, the tracking controller 112 uses a signal from a commercially available Inertial Navigation Unit (INU) to determine a direction of the target 104 to within a pull-in range of the monopulse tracking system (i.e., within the first null of the main beam pattern 122) in an open loop positioning process (step 1002).

The target 104 emits signals to the antenna system 102 (e.g., communications signals or RADAR reflections) in a receive frequency band (e.g., 20 GHz). The target 104 (e.g., a beacon) can generate linearly polarised signals, or for some targets 104 (e.g., a satellite) the polarisation can vary from circular to linear polarisation depending on the elevation.

The emitted signals are received in at least two beam patterns: the main beam pattern 122 and the null beam patterns 124. The received signals are coupled to tracking mode signals in the two orthogonal tracking waveguide modes and receive mode signals in the non-tracking/receive waveguide mode.

The feed subsystem 300 is configured for tracking both circular and linearly polarised signals. The orthogonal tracking waveguide modes can be two linear or circular polarisations of a higher-order mode, e.g., TE21. The receive waveguide mode can be a fundamental mode, e.g., TE11.

In the operation process 1000, the antenna system 102 is in receive-only mode after acquiring the target 104 using the "open loop" search mode in step 1002.

The antenna system 102 generates tracking signals from the received signals using the tracking coupler 702 and the receive coupler 802 (step 1004). The tracking coupler 702 extracts signals from the tracking mode signals mode to generate tracking difference signals, and the receive coupler 802 generates tracking sum signals from the receive mode signals. The tracking sum signals and tracking difference signals are used in accordance with the monopulse technique to track the target 104. The tracking coupler 702 generates the tracking difference signals in both polarisations, which correspond to vertical and azimuthal pointing errors. The receive coupler 802 generates the tracking sum signals at both polarisations, thus allowing the tracking controller 112 to control the antenna system 102 to track the target 104 in two dimensions (i.e., to correct both azimuthal and vertical tracking errors).

The receive coupler 802 generates the receive signals, which include the data channel signals, from the receive mode signals (step 1006).

The tracking controller 112 performs a tracking process on the antenna system 102 based on the monopulse technique using the tracking signals (step 1008), described in more detail hereinafter.

Once the antenna system 102 is directed at the target 104, it can transmit signals to the target 104. This may be required for regulatory reasons as significant interference can be caused to adjacent satellites if the antenna system 102 transmits without being aligned to the target 104. The antenna system 102 transmits signals (which can be in two orthogonal polarisations) in a transmission frequency band (e.g., 30 GHz) from the transmit subsystem 302 to the reflector subsystem 200 through the other portions of the feed subsystem 300. The reflector subsystem 200 directs radiation representing the transmit signals to the target 104 (step 1009). In the communication system 100, the transmit signals can represent information or data for transmission to the target 104, such as command and control information for a satellite network.

Monopulse Tracking Process

Figure 10A:
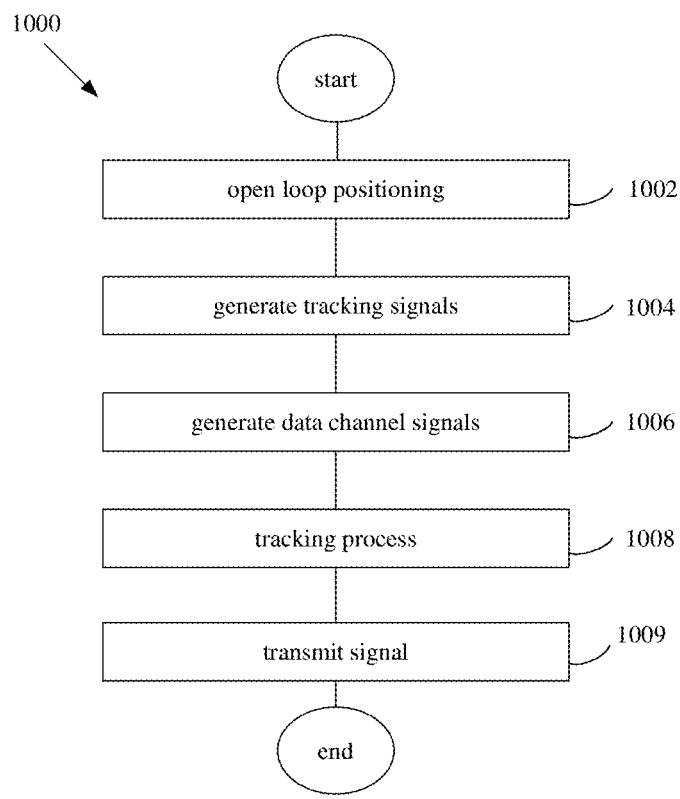
FIG. 10A is a flowchart of an operation process of the antenna system.
Figures 10B, 10C:
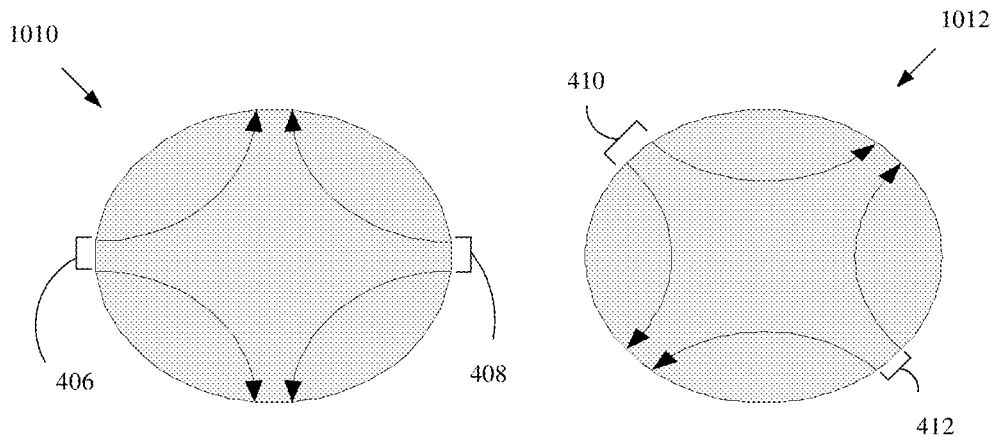
FIG. 10B is a schematic diagram of the input port with the electric field of the first TE21 mode.
FIG. 10C is a schematic diagram of the input port with the electric field of the second TE21 mode.

For a circular embodiment of the tracking coupler 702, the null beam signals are in a first TE21 mode 1010 (corresponding to a first linear or circular polarisation), as shown in FIG. 10B, and a second TE21 mode 1012, corresponding to second linear or circular polarisation, as shown in FIG. 10C. The first TE21 mode 1010 and the second TE21 mode 1012 are also shown in FIGS. 7E and 7F respectively.

The first left port 406 and the first right port 408 of the tracking coupler are located at maximum/minimum points in the mode pattern of the first TE21 mode 1010, as shown in FIG. 10B. The second left port 410 and the second right port 412 of the tracking coupler are located at minimum/maximum points in a mode pattern of the second TE21 mode 1012, as shown in FIG. 10C.

As the first TE21 mode 1010 and second TE21 mode 1012 are orthogonal and correspond to radiation received from the orthogonal null beam patterns 124, the first pair of ports 406, 408 can extract signals corresponding to a first plane aligned along the boresight 118, and the second pair of ports 410, 412 can extract signals corresponding to a second plane aligned along the boresight 118. The second plane is orthogonal to (or perpendicular to) the first plane.

As the pairs of ports detect orthogonal TE21 polarisations, tracking coupler 702 generates signals corresponding to the first misalignment plane and the second misalignment plane regardless of the polarisation of the TE21 signals.

Figure 10D:
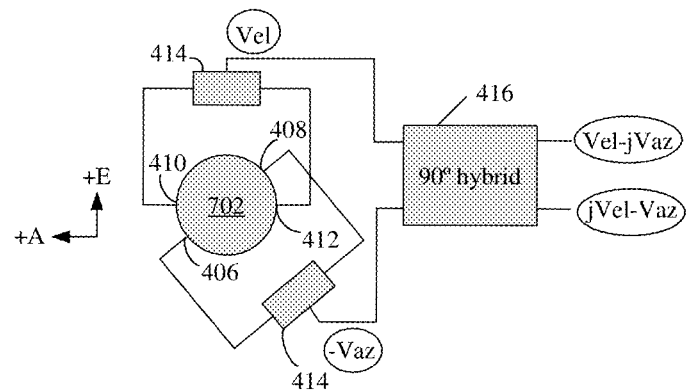
FIG. 10D is a schematic diagram of the tracking combiner network showing tracking difference signals generated from a horizontal input polarisation with azimuth and vertical antenna pointing errors.

For horizontal input polarisations (e.g., a TE21 polarisation aligned in the azimuthal direction), for the directions shown in FIG. 10D, movement in the positive azimuthal direction (marked as +A) generates a corresponding (negative) voltage signal (−Vaz) at the output of the E-plane Y junction 414 connected to the pair of ports 406, 408 that are aligned at 45 degrees to both the vertical and azimuthal directions. Movement in the positive vertical direction (marked as +E) generates a corresponding (positive) voltage signal (Vel) at the output of the E-plane Y junction 414. The other E-plane Y junction 414 is connected to the pair of ports 410, 412 aligned to the azimuthal direction.

For horizontal input polarisations, the outputs of the 90-degree hybrid 416 are Vel-jVaz at one port and jVel-Vaz at the other port, as shown in FIG. 10D, where the complex mathematical notation (V1+jV2) represents voltages (V1 and V2) that are in quadrature to each other.

Figure 10E:
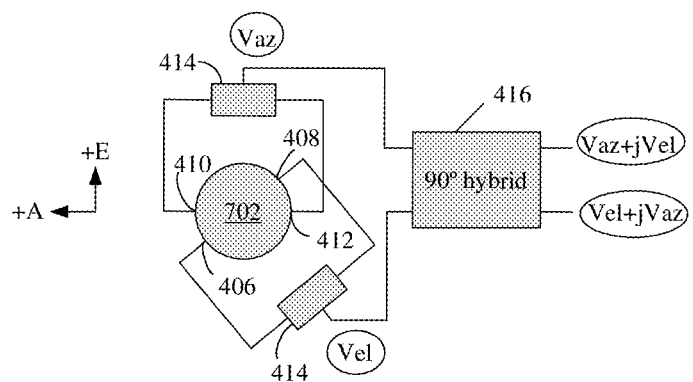
FIG. 10E is a schematic diagram of the tracking combiner network showing tracking difference signals generated from a vertical input polarisation with azimuth and vertical antenna pointing errors.
Figure 11:
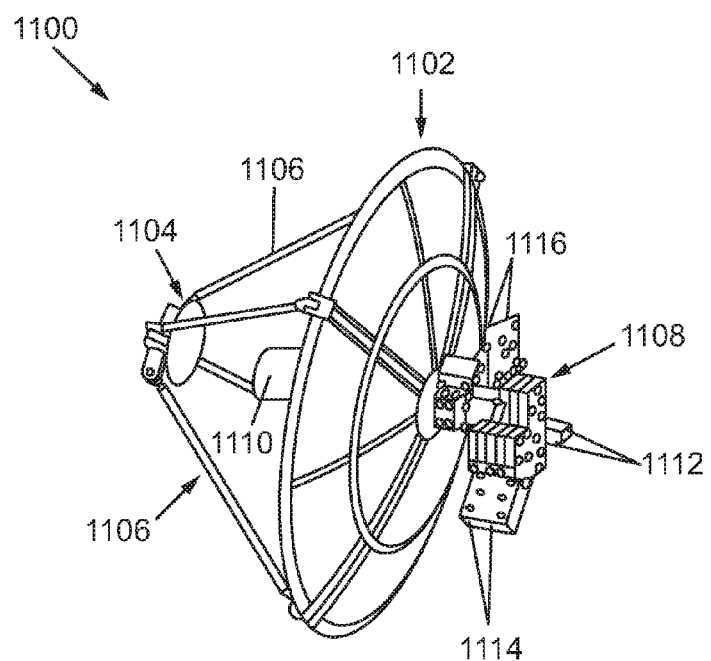
FIG. 11 is a perspective view of a mechanical model of an example antenna system.

For vertical input polarisations (e.g., a TE21 polarisation aligned in the vertical direction), for the directions shown in FIG. 10E, movement in the positive azimuthal direction (marked as +A) generates a corresponding (positive) voltage signal (Vaz) at the output of the E-plane Y junction 414 connected to the pair of ports 410, 412 that are aligned in the azimuthal direction. Movement in the positive vertical direction (marked as +E) generates a corresponding (positive) voltage signal (Vel) at the output of the E-plane Y junction 414 connected to the pair of ports 406, 408 that are aligned at 45 degrees to both the vertical and azimuthal directions.

For vertical input polarisations, the outputs of the 90-degree hybrid 416 are Vaz+jVel at one port and Vel+jVaz at the other port, as shown in FIG. 10E.

The outputs of the 90-degree hybrid 416 are amplified by LNAs and fed to the tracking controller 112. The outputs of the receiver ports 814 are also amplified using LNAs and fed to the tracking controller 112. In the tracking controller 112, the tracking difference signal is normalised for its phase and intensity variations, using the tracking sum signal, and the in-phase and quadrature components of the difference signals are used to generate signals representing the vertical and azimuthal misalignment errors. The tracking output signals, which provide a tracking difference signal, can be used to determine the magnitude of a pointing error; the tracking sum signals, based on the receive output signals, are required to determine the direction of this pointing error (by correcting for the phase of the receive signals). The azimuth and vertical errors are output in phase quadrature as symbolised by the use of complex numbers.

For receiving a linearly polarised signal, the tracking signals are decomposed into two circularly polarised signals. Only one of these is used to generate the tracking output signals. Linearly polarised signals can be represented by a pair of left-hand and right-hand circularly polarised signals. The receive subsystem 500 (providing the sum channel) can be set to receive the same hand of polarisation as the tracking subsystem 400 (providing the difference channel), and the other hand of circular polarisation can be discarded.

The tracking controller 112 includes an active servo system for controlling the mount 110 to continuously correct any non-zero vertical and azimuthal misalignment errors using closed-loop control.

Example Antenna System 1100

An example antenna system 1100 of the antenna system 102 is shown in FIGS. 11 and 12A-12E.

The diameter of an example main reflector 1102 is about 480 mm and the diameter of an example sub reflector 1104 is about 80 mm. The example sub reflector 1104 is supported above the example main reflector 1102 by four support struts 1106. This example aperture diameter is just below 50 wavelengths at 31 GHz and can conform with the side-lobe requirements of the military standard MIL-STD-188-164A.

The example antenna system 1100 includes an example feed subsystem 1108 with a length of about 135 mm from the back of the example main reflector 1102. The length of the example tracking coupler and cosine squared taper is about 60 mm. This may be substantially less than existing monopulse tracking systems that are impractically large for a portable, on-the-move antenna system.

Figure 12A:
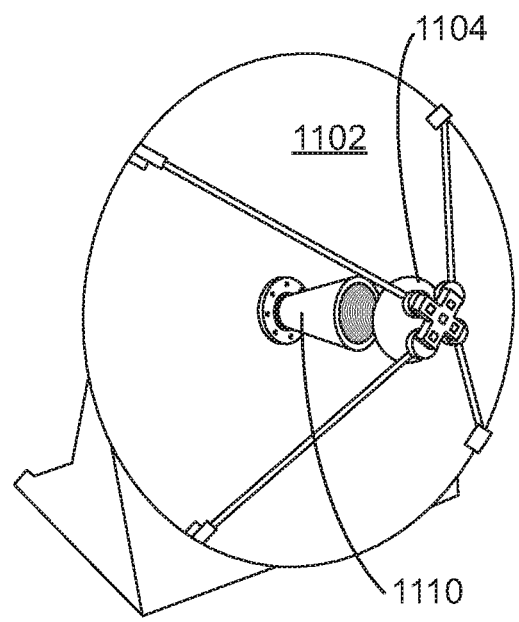
FIG. 12A is a photograph showing a front perspective view of the example antenna system.
Figure 12B:
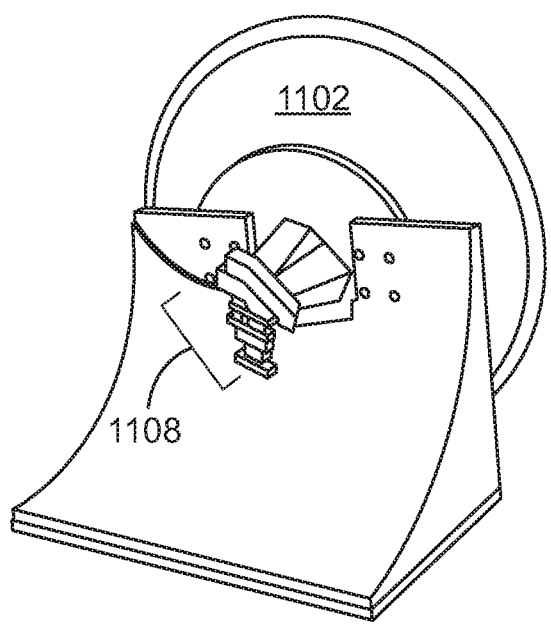
FIG. 12B is a photograph showing a back perspective view of the example antenna system.
Figure 12C:
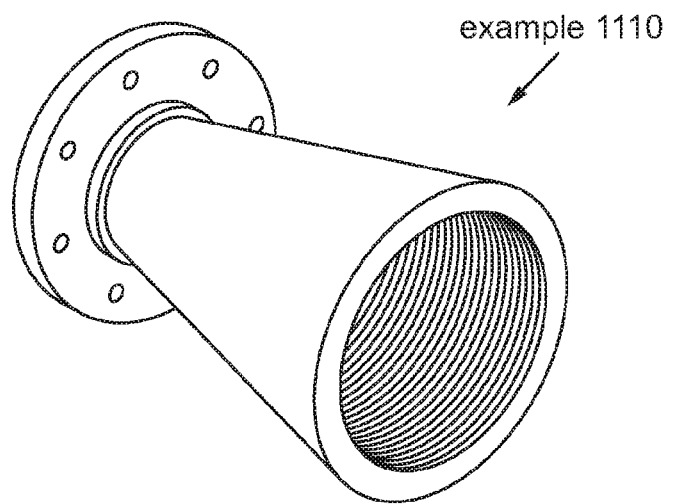
FIG. 12C is a photograph showing a perspective front view of an example horn.
Figure 12D:
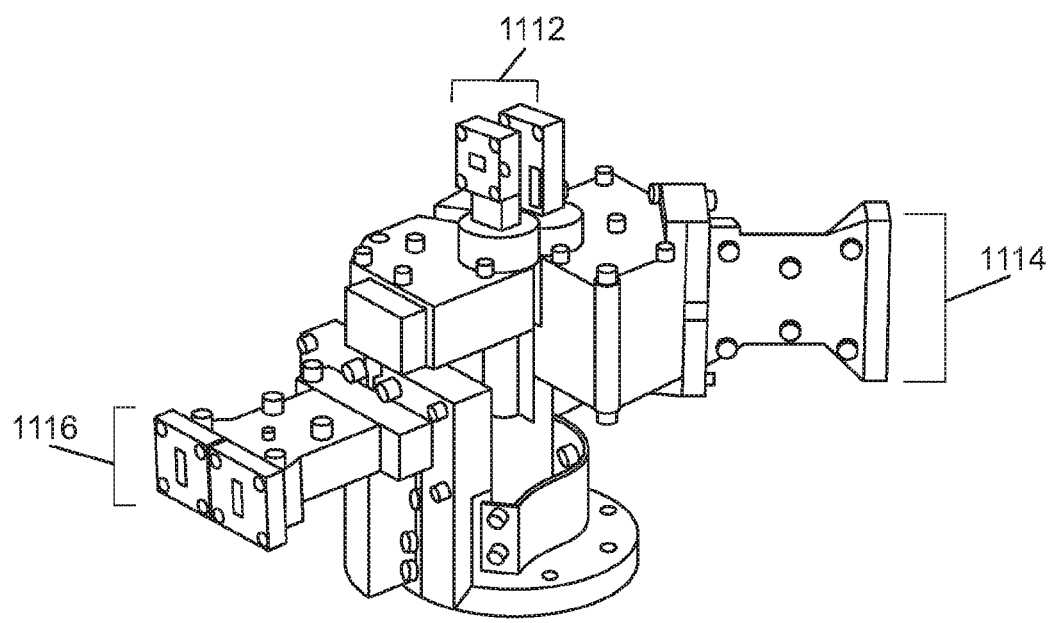
FIG. 12D is a photograph showing a side perspective view of a portion of an example feed subsystem.
Figure 12E:
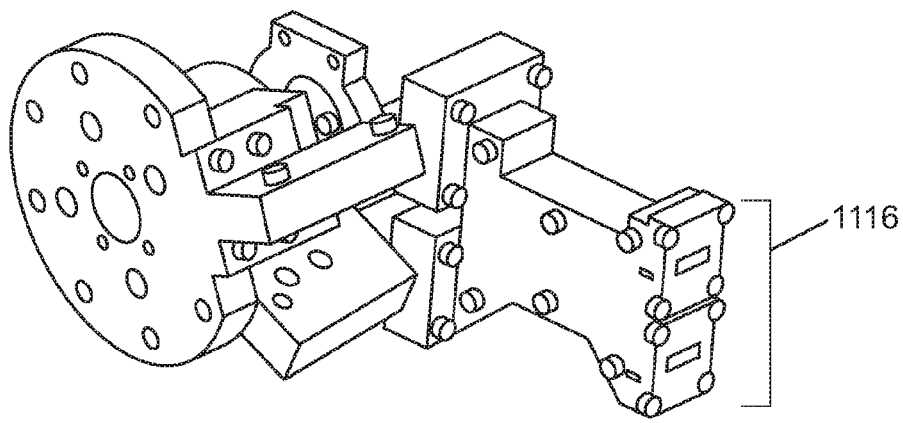
FIG. 12E is a photograph of a front perspective view of an example tracking coupler portion of the example feed subsystem.
Figure 12F:
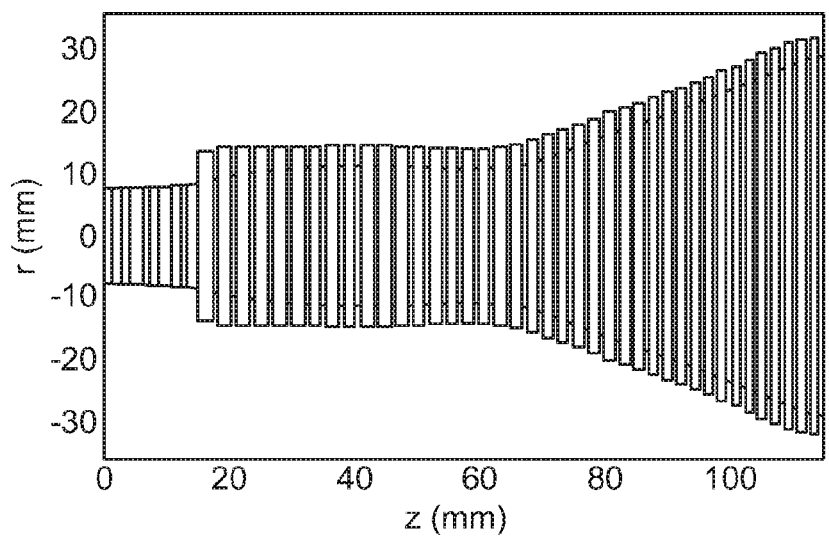
FIG. 12F is a graph of a cross section of an example Ka-band horn, with radius (r) in millimeters (mm) on the Y axis, and length (z) in mm on the X axis.

An example horn 1110 has a length of about 100 mm, and an inner cavity gradually widening from a 10-mm radius aperture at the narrow end to a 30-mm radius aperture at the wide end, as shown in FIG. 12F.

An example of the taper 706 can have an input diameter of about 16.6 mm, an output diameter of about 10.0 mm, and a length of about 25 mm.

The eight example TE11 mode guiding ridges are equally spaced, being about 1 mm wide and 1.25 mm high for Ka band operation.

The waveguide interfaces for the example transmit ports 1112 are modified WR28 with UBR320 flange. The WR28 waveguide can increase the TE10 cut-off frequency to approximately 25 GHz, thus improving transmit-to-receive isolation. The waveguide interfaces for the example receive ports 1114 and the example tracking ports 1116 are WR42 with UBR220 flange.

The waveguide components in the example feed subsystem are machined with a tolerance of 0.02 mm from aluminium and finished with chromate. An example septum polariser is machined from a single piece of aluminium using Electrical Discharge Machining (EDM), or "spark erosion", to provide dimensions at the required tolerances.

The transmit-to-tracking signal isolation, i.e., the ratio of the transmit signal (e.g., TE11 at about 30 GHz) to the tracking difference signal at the LNA, can be about −90 dB or less. The receive-to-tracking signal isolation, i.e., the ratio of the receive signal (e.g., TE11 at about 20 GHz) to the tracking difference signal at the LNA, can be about −36 dB or less.

The axial ratio can be better than about 1 dB for transmit and 1.5 dB for receive.

Applications

The antenna system 102 may be more compact than previous monopulse tracking antenna systems, which may be advantageous for on-the-move applications, such as in vehicles. In particular, the diameter of the reflector subsystem 200 and the axial length of the feed subsystem 300 may be much smaller than previous monopulse tracking systems. The components of the feed subsystem 300 are highly integrated with one another, which may allow for compact design of the antenna system 102 and rapid rotation of the antenna system 102 while tracking.

The monopulse tracking operation of the antenna system 102 may provide a wider pull-in range than alternative tracking methods.

The antenna system 102 may operate with more widely separated transmit and receive signals than at least some existing tracking systems. Embodiments of the antenna system 102 may operate in the Ka band with the receive band at about 20 GHz (e.g., 20.2 to 21.2 GHz) and the transmit band at about 30 GHz (e.g., 30.0 to 31.0 GHz).

Fast control of the pointing of the antenna system 102 may be applicable in fast moving applications, such as in smaller platforms (e.g., small boats or land vehicles) that wobble and vibrate at higher frequencies than larger ships or planes (even if they travel more slowly).

Having a high pointing accuracy and a wide pull-in range may be applicable when communications links, along the link 106, needs to be maintained continuously for a substantial period of time, e.g., for cryptographic communications, which can take minutes to establish (e.g., due to exchange of cryptographic keys, etc.).

Interpretation

Many modifications will be apparent to those skilled in the art without departing from the scope of the present invention.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

RELATED APPLICATIONS

This application is related to Australian Provisional Patent No. 2010904941 (filed on 8 Nov. 2010, in the name of BAE Systems Australia Limited), the specification of which is hereby incorporated by reference herein.

REFERENCE SIGNS LIST

| Sign | Associated Phrase |
|---|---|
| 100 | communication system |
| 102 | antenna system |
| 104 | target |
| 106 | link |
| 108 | platform |
| 110 | mount |
| 112 | tracking controller |
| 114 | radome |
| 116 | communications processing system |
| 118 | boresight |
| 120 | antenna pattern |
| 122 | main beam pattern |
| 124 | null beam patterns |
| 200 | reflector subsystem |
| 202 | main reflector |
| 204 | sub reflector |
| 206 | support |
| 300 | feed subsystem |
| 300B | square feed subsystem |
| 300C | receive-only feed subsystem |
| 300D | alternative receive-only feed subsystem |
| 302 | transmit subsystem |
| 304 | first transmit port |
| 306 | second transmit port |
| 308 | matched load termination |
| 310 | square receive section |
| 311 | square transmit section |
| 312 | square transmit OMT |
| 314 | vertical polarisation section |
| 316 | phase compensator |
| 318 | horizontal polarisation section |
| 320 | 3-decibel (dB) hybrid |
| 322 | receive ports |
| 324 | transmit ports |
| 326 | 3-dB hybrid |
| 328 | phase compensator |
| 330 | single band horn |
| 332 | septum polariser |
| 334 | polariser |
| 336 | receive OMT |
| 400 | tracking subsystem |
| 402 | tracking port ends |
| 404 | input port |

REFERENCE SIGNS LIST

| Sign | Associated Phrase |
|---|---|
| 406 | first left port |
| 408 | first right port |
| 410 | second left port |
| 412 | second right port |
| 414 | E-plane Y junction |
| 416 | 90-degree hybrid |
| 417 | tracking output ports |
| 418 | first difference port |
| 420 | Low Noise Amplifier (LNA) |
| 422 | second difference port |
| 500 | receive subsystem |
| 502 | receiver port ends |
| 504 | H-plane Y junction |
| 506 | 90-degree hybrid |
| 508 | first receiver port |
| 510 | second receiver port |
| 512 | LNA |
| 600 | horn |
| 602 | horn input port |
| 702 | tracking coupler |
| 704 | tracking combiner network |
| 706 | taper |
| 708 | filter-free combiner network |
| 710 | transmit-reject filters |
| 714 | branch guide coupler |
| 716 | phase compensators |
| 720 | mode guide ridges |
| 722 | transformer |
| 724 | main body |
| 750 | TE11 horizontal mode |
| 752 | TE11 vertical mode |
| 754 | TM01 mode |
| 802 | receive coupler |
| 804 | receive combiner network |
| 806 | receive input port |
| 808 | transmit-reject filters |
| 812 | branch guide coupler |
| 814 | receiver output ports |
| 902 | circular-to-square transformer |
| 904 | septum polariser |
| 906 | stepped metal septum |
| 1000 | operation process |
| 1010 | first TE21 mode |
| 1012 | second TE21 mode |
| 1100 | example antenna system |
| 1102 | example main reflector |
| 1104 | example sub reflector |
| 1106 | support strut |
| 1108 | example feed subsystem |
| 1110 | example horn |
| 1112 | example transmit ports |
| 1114 | example receive ports |
| 1116 | example tracking ports |

The invention claimed is:

1. An antenna system comprising:
an input port configured to receive tracking mode signals, in two orthogonal polarisations, from a target, and to receive receive-mode signals from the target;
a tracking coupler configured to receive the tracking mode signals from the input port, the tracking coupler including:
a first pair of opposed slot couplers configured to extract tracking signals from the tracking mode signals in a first one of the orthogonal polarisations,
a second pair of opposed slot couplers configured to extract tracking signals from the tracking mode signals in a second one of the orthogonal polarisations; and
a ridged waveguide in the tracking coupler configured to couple receive mode signals from the target through the tracking coupler, wherein the ridged waveguide includes eight generally equally spaced longitudinal ridges along the tracking coupler; and a tracking combiner network configured to combine the extracted tracking signals from the first and second pairs of opposed slot couplers to generate tracking output signals for use in controlling the antenna system to track the target.

2. The antenna system of claim 1, comprising:

a cosine-squared taper coupled to the tracking coupler and configured to reflect the tracking mode signals and pass receive mode signals from the target without generating higher-order waveguide mode signals at higher frequencies than the tracking mode signals or the receive mode signals.

3. The antenna system of claim 2, wherein the receive mode signals from the target are in a fundamental mode, and the tracking mode signals are in two orthogonal higher-order modes, wherein the tracking coupler comprises:

a circular main wave guide, wherein the fundamental mode is a TE11 mode and the higher-order modes are TE21 modes, and wherein the tracking coupler is configured to not couple to a TM01 mode.

4. The antenna system of claim 2, wherein the tracking mode signals and the receive mode signals from the target are microwave frequency signals in the Ka band including frequencies of about 20 GHz.

5. The antenna system of claim 2, wherein the tracking mode signals and the receive mode signals from the target are linearly polarised and/or circularly polarised.

6. The antenna system of claim 1, comprising:

hybrid combiners coupled to the first and second pairs of opposed slot couplers and configured to combine the extracted tracking signals from the slot couplers in each pair and to reflect the receive mode signals from the target back into the tracking coupler.

7. The antenna system of claim 1, wherein each slot coupler comprises:

a single slot, aligned longitudinally along the tracking coupler.

8. The antenna system of claim 1, wherein the first pair of opposed slot couplers is rotated by about 45 degrees around a central axis of the tracking coupler from the second pair of opposed slot couplers.

9. The antenna system of claim 8, wherein the first pair of opposed slot couplers is offset from the second pair of opposed slot couplers along the central axis of the tracking coupler by a length of about half a wavelength of the tracking mode signals.

10. The antenna system of claim 1, comprising:

reflectors configured to receive and focus signals from the target; and a horn configured to guide power from a main beam pattern into the receive mode signals from the target, and guide power from two null beam patterns into the two orthogonal polarisations of the tracking mode signals, from the reflectors to the input port, wherein the reflectors include a main reflector and a sub reflector, the sub reflector being mounted within an arc defined by a radius of the main reflector, and wherein the horn is mounted to the main reflector, and includes a frustoconical bore with a corrugated interior surface.

11. The antenna system of claim 1, comprising:

a receive coupler configured to extract receive signals from the receive mode signals from the target; and a receive combiner network configured to combine the extracted receive signals to generate receive output signals representing a tracking sum signal for use in controlling the antenna system to track the target, such that the tracking sum signal will be used with the tracking output signals to generate an error signal representing an angular pointing error between a pointing direction of the antenna system and a direction to the target.

12. The antenna system of claim 1, comprising:

a transmit subsystem coupled to the tracking coupler for generating transmit signals for sending to the target, wherein the transmit subsystem includes a septum polariser configured to generate circularly polarised transmit signals;

wherein the tracking coupler is configured to pass the transmit signals from the transmit subsystem to the input port;

wherein at least one of the tracking coupler and the tracking combiner network includes a transmit-reject filter configured to reject the transmit signals from the tracking combiner network, the transmit-reject filters being low pass filters formed in arms of the tracking combiner network; and wherein the transmit signals are in a TE11 mode, and are microwave frequency signals in the Ka band including frequencies of about 30 GHz.

13. The antenna system of claim 1, further comprising:

a transmit subsystem configured to generate transmit signals for sending to the target; and transmit-reject filters configured to reject the transmit signals from the tracking combiner network.

14. The antenna system of claim 1, wherein the receive signals and the transmit signals are microwave frequency signals in the Ka band, and the receive signals include frequencies of about 20 GHz, and the transmit signals include frequencies of about 30 GHz.

15. A tracking coupler for an antenna system, comprising:

two or more orthogonal slot couplers configured to extract tracking signals from orthogonal higher-order modes received by the antenna system, for use in controlling the antenna system to track a target; and eight longitudinal ridges generally equally spaced along the tracking coupler and configured to couple a fundamental mode received by the antenna system through the tracking coupler for use in generating a receive signal.

16. The tracking coupler of claim 15, wherein the eight longitudinal ridges are equally and circumferentially spaced ridges.

17. A method of tracking a target using an antenna system, the method comprising:

receiving tracking mode signals, in two orthogonal polarisations, from the target, using the antenna system;

extracting tracking signals from the tracking mode signals in a first one of the orthogonal polarisations using a first pair of opposed slot couplers;

extracting tracking signals from the tracking mode signals in a second one of the orthogonal polarisations using a second pair of opposed slot couplers;

coupling receive mode signals from the target past the first and second pairs of slot couplers using a ridged waveguide having eight generally equally spaced longitudinal ridges along the tracking coupler; and combining the extracted tracking signals from the first and second orthogonal polarisations to generate tracking output signals for use in controlling the antenna system to track the target.

18. The method of claim 17, comprising: reflecting the tracking mode signals and passing receive mode signals from the target without generating higher order waveguide mode signals at a different frequency using a cosine-squared taper.

19. The method of claim 17, comprising:
  combining the extracted tracking signals from the slot couplers in each pair of opposed slot couplers; and
  reflecting the receive mode signals from the target back into the tracking coupler using a hybrid combiner.

* * * * *